United States Patent [19]
Miki et al.

[11] Patent Number: 5,606,092
[45] Date of Patent: Feb. 25, 1997

[54] MONOAZO COMPOUNDS AND METHOD FOR DYEING OR PRINTING FIBER MATERIALS USING THE SAME

[75] Inventors: Masayuki Miki, Ashiya; Kingo Akahori, Toyonaka; Yutaka Kayane, Ikoma; Takeshi Washimi, Toyonaka, all of Japan

[73] Assignee: Sumitomo Chemical Company, Limited, Osaka, Japan

[21] Appl. No.: 546,321

[22] Filed: Oct. 20, 1995

Related U.S. Application Data

[62] Division of Ser. No. 193,646, Feb. 7, 1994, Pat. No. 5,488,098, which is a continuation of Ser. No. 840,560, Feb. 25, 1992, abandoned.

[30] Foreign Application Priority Data

Feb. 27, 1991 [JP] Japan ..................... 3-033047
Feb. 28, 1991 [JP] Japan ..................... 3-034245

[51] Int. Cl.$^6$ ..................... C07C 317/28; C07C 317/34
[52] U.S. Cl. ..................... 558/33; 558/184; 560/251; 560/308
[58] Field of Search ..................... 558/33

[56] References Cited

U.S. PATENT DOCUMENTS

| | | | |
|---|---|---|---|
| 4,237,050 | 12/1980 | Springer | 540/124 |
| 4,330,468 | 5/1982 | Brierley et al. | 558/33 X |
| 4,346,046 | 8/1982 | Nishimura et al. | 558/33 X |
| 4,766,206 | 8/1988 | Tzikas | 534/638 X |
| 5,037,965 | 8/1991 | Morimitsu et al. | 534/612 |
| 5,175,263 | 12/1992 | Schlafer | 534/638 |

FOREIGN PATENT DOCUMENTS

| | | | |
|---|---|---|---|
| 0221013 | 5/1987 | European Pat. Off. | |
| 0372543 | 6/1990 | European Pat. Off. | |
| 0384276 | 8/1990 | European Pat. Off. | |
| 0384372 | 8/1990 | European Pat. Off. | |
| 418664 | 3/1991 | European Pat. Off. | 534/612 |
| 2040620 | 2/1972 | Germany . | |
| 3905074 | 8/1990 | Germany . | |
| 1354906 | 5/1974 | United Kingdom . | |

OTHER PUBLICATIONS

Chemical Abstracts, 114, 64249T, Ludwig Schlaefer: "Bifunctional reactive azo dyes" DE 3,905,403 (1991).
Chemical Abstracts, 114, 1454371, Springer et al.: "Reactive azo dyes" DE 3,905,074 (1991).

*Primary Examiner*—Fiona T. Powers
*Attorney, Agent, or Firm*—Watson Cole Stevens Davis P.L.L.C.

[57] ABSTRACT

A monoazo compound of the following formula,

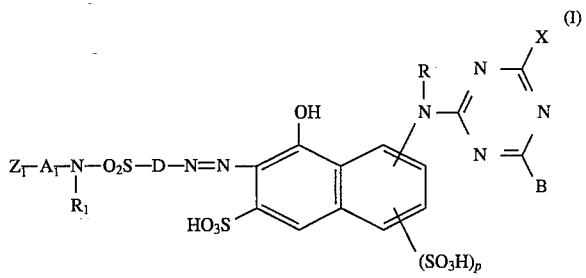

wherein D is phenylene or naphthylene; X is halogeno, pyridinio or

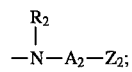

B is —$OR_3$, —$SR_4$,

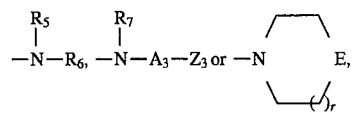

in which $R_3$, $R_4$, $R_5$ and $R_6$ are each hydrogen, alkyl, phenyl, naphthyl or benzyl, r is 0 or 1, and E is O, SO, $SO_2$, $CH_2$ or $NR_8$, in which $R_8$ is hydrogen or $C_1$–$C_4$ alkyl; R, $R_1$, $R_2$ and $R_7$ are each hydrogen or alkyl; $A_1$, $A_2$ and $A_3$ are each phenylene, naphthylene or alkylene; $Z_1$, $Z_2$ and $Z_3$ are each —$SO_2CH=CH_2$ or —$SO_2CH_2CH_2Y$, in which Y is a splittable group; and p is 0 or 1; which compound is useful for dyeing or printing fiber materials to obtain a product dyed or printed in a color superior in various fastness properties with superior build-up property.

3 Claims, No Drawings

MONOAZO COMPOUNDS AND METHOD FOR DYEING OR PRINTING FIBER MATERIALS USING THE SAME

This is a division of application Ser. No. 08/193,646, filed Feb. 7, 1994;, now U.S. Pat. No. 5,488,098 which in turn is a continuation of application Ser. No. 07/840,560, filed Feb. 25, 1992, now abandoned.

The present invention relates to improved compounds suitable for use in dyeing and printing materials containing hydroxyl group and/or amide group, particularly those such as cellulose fiber, natural and synthetic polyamide fibers, polyurethane fiber, leather and mixed yarns thereof, to obtain a red color fast to light and wetness, as well as application of said compounds.

There are known compounds having a vinyl sulfone type reactive group and a monohalogenotriazine type reactive group in one molecule and compounds having two vinyl sulfone type reactive groups in one molecule, as disclosed in EP 384276, etc. However, they are yet insufficient from the viewpoint of dyeing performances such as build-up property, and a further improvement of these dyes is waited for.

A variety of reactive dyes have hitherto been used extensively for dyeing and printing fiber materials. Today's level of the technique, however, is unsatisfactory from the viewpoint of the high requirements concerning applicability to particular dyeing processes and the requirement concerning fastness properties of the dyed products which is becoming higher.

For example, the so far known reactive dyes are unsatisfactory in solubility, dyeing performances such as build-up property, and fastness properties, and it is intensely desired to develop a more improved dye.

The excellency in build-up property is a very important factor of the dye, because today's dyeing processes have become requiring a more and more elevated economicity. The present inventors have conducted extensive studies with the aim of discovering a novel compound capable of overcoming the above-mentioned faults of the known dyes and extensively fulfilling the necessary conditions which a dye must fulfil, and as a result, the present invention has been accomplished.

The present invention provides a monoazo compound represented by the following formula (I) in the free acid form,

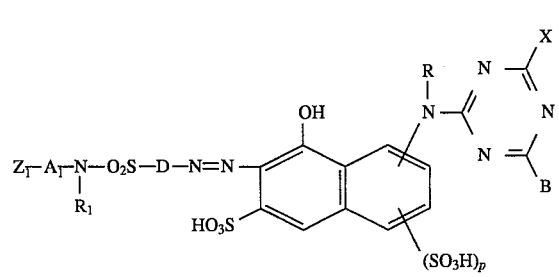

(I)

wherein D is an unsubstituted or substituted phenylene or naphthylene group; X is halogeno, an unsubstituted or substituted pyridinio group or

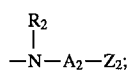

B is —OR$_3$, —SR$_4$,

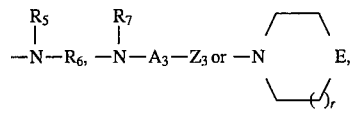

in which $R_3$, $R_4$, $R_5$ and $R_6$ independently of one another are each hydrogen, or an unsubstituted or substituted alkyl, phenyl, naphthyl or benzyl group, r is 0 or 1, and E is O, SO, $SO_2$, $CH_2$ or $NR_8$, in which $R_8$ is hydrogen or $C_1$–$C_4$ alkyl; R, $R_1$, $R_2$ and $R_7$ independently of one another are each hydrogen, or an unsubstituted or substituted alkyl group; $A_1$, $A_2$ and $A_3$ independently of one another are each an unsubstituted or substituted phenylene, naphthylene or alkylene group; $Z_1$, $Z_2$ and $Z_3$ independently of one another are each —$SO_2CH=CH_2$ or —$SO_2CH_2CH_2Y$, in which Y is a group capable of being split by the action of an alkali; and p is 0 or 1.

The present invention also provides a process for producing the monoazo compound represented by the formula (I), which comprises subjecting a compound represented by the following formula (II) in the free acid form,

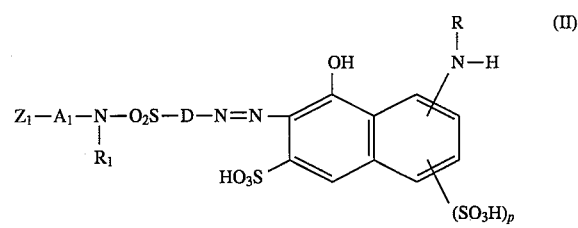

(II)

wherein D, R, $R_1$, $A_1$, $Z_1$ and p are as defined above, any one of compounds represented by the following formulas (III) to (VII)

| | |
|---|---|
| $HOR_3$ | (III) |
| $HSR_4$ | (IV) |
| $HNR_5R_6$ | (V) |

(VI)

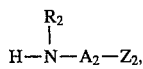

(VII)

wherein $R_3$, $R_4$, $R_5$, $R_6$, $R_7$, $A_3$, $Z_3$, r and E are as defined above, and optionally unsubstituted or substituted pyridine or an amine represented by the formula of $$H-N(R_2)-A_2-Z_2,$$

in which $R_2$, $A_2$ and $Z_2$ are as defined above, to a condensation reaction with 2,4,6-trihalogeno-s-triazine in an optional order.

In formula (I), preferable examples of the phenylene and naphthylene represented by $A_1$, $A_2$ and $A_3$ include phenylene unsubstituted or substituted once or twice by a substituent selected from the group consisting of methyl, ethyl, methoxy, ethoxy, chloro, bromo and sulfo and naphthylene unsubstituted or substituted by sulfo, of which specific examples include the followings:

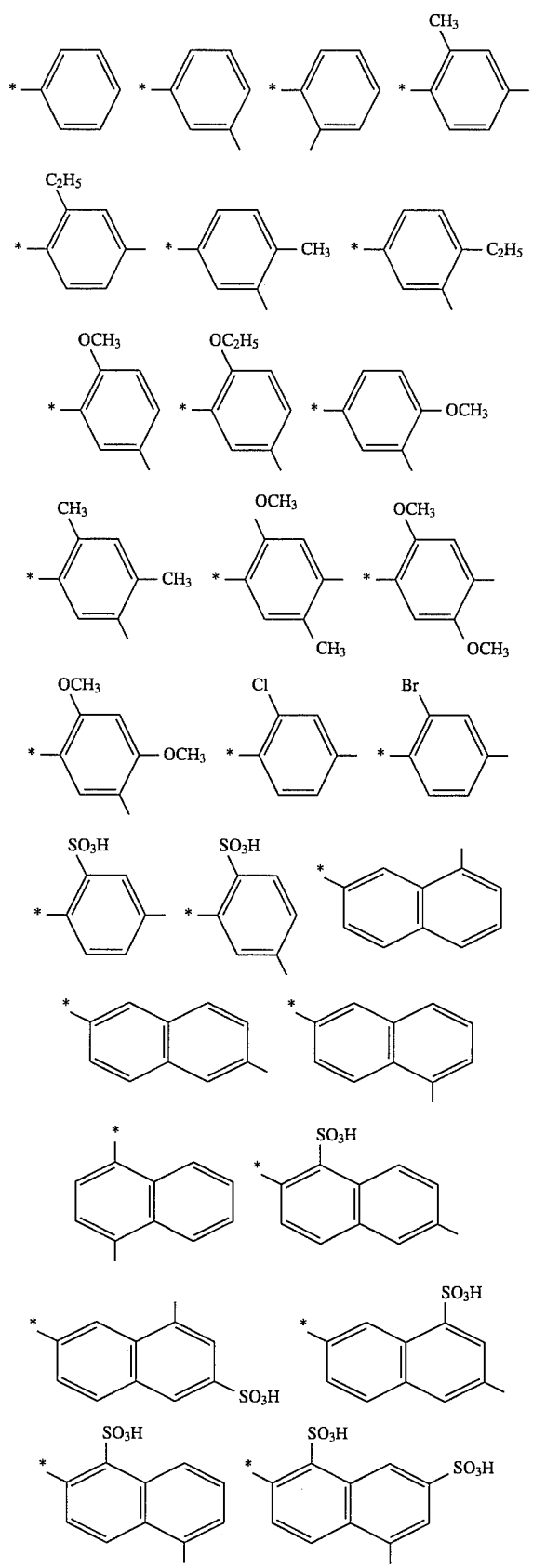

wherein the mark * signifies a bond linking to

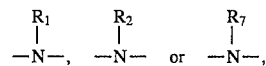

and the like.

Among the phenylene and naphthylene represented by $A_1$, $A_2$ and $A_3$, phenylene is more preferable, and the groups represented by the following formulas:

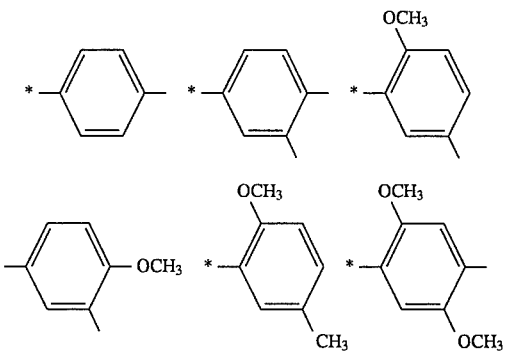

are particularly preferable, wherein the mark * signifies a bond linking to

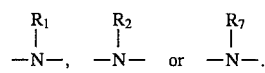

As the alkylene represented by $A_1$, $A_2$ and $A_3$, the groups represented by the following formulas can be referred to:

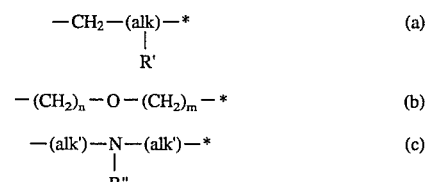

wherein the mark * signifies a bond linking to

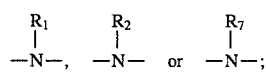

alk represents a polymethylene group having 1 to 6 carbon atoms or its branched isomer; R' represents hydrogen, chloro, bromo, fluoro, hydroxy, sulfato, acyloxy having 1 to 4 carbon atoms, cyano, carboxy, alkoxycarbonyl having 1 to 5 carbon atoms or carbamoyl; R" represents hydrogen or alkyl having 1 to 6 carbon atoms; the groups alk' independently of one another each represents polymethylene having 2 to 6 carbon atoms or its branched isomer, provided that alk' and R" may be taken together to form a ring via a methylene group; n represents 1 to 6; and m represents an integer of 1 to 6.

In formula (a), the polymethylene group represented by alk is preferably methylene, ethylene, methylmethylene, propylene or butylene.

Examples of R" include hydrogen, methyl, ethyl, propyl, isopropyl, butyl, isobutyl, sec-butyl, tert-butyl, pentyl, hexyl and the like, among which hydrogen is preferable. The polymethylene group represented by alk' is preferably ethylene, propylene or butylene.

The numbers represented by n and m independently of one another are each 2, 3 or 4, among which 2 is preferable.

Preferable examples of D include phenylene unsubstituted or substituted once or twice by a substituent selected from the group consisting of methyl, ethyl, methoxy, ethoxy, chloro, bromo and sulfo and naphthylene unsubstituted or substituted by sulfo. Specific examples thereof include the followings:

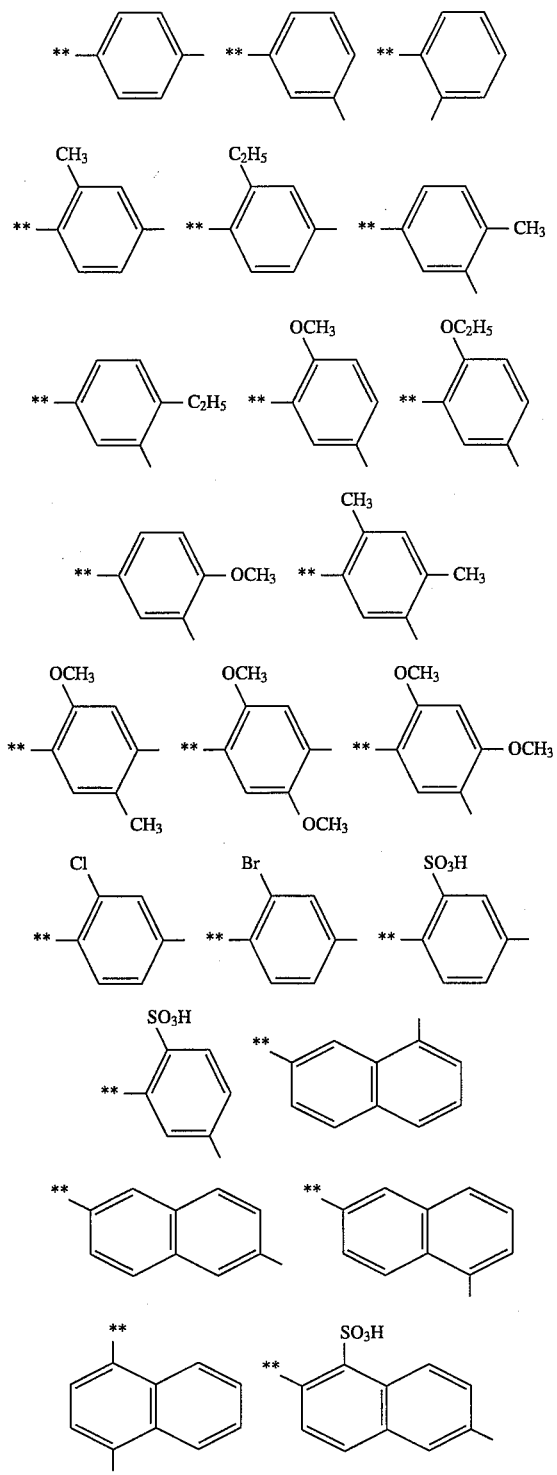

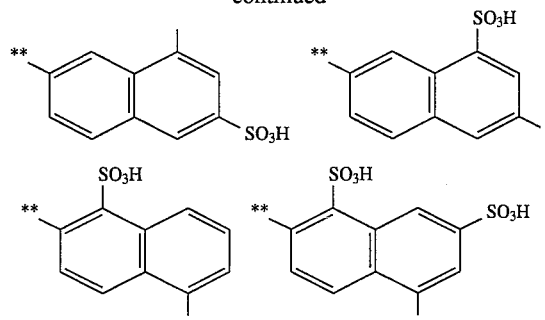

wherein the mark ** signifies a bond linking to —N=N—, and the like.

Preferable examples of D include the followings:

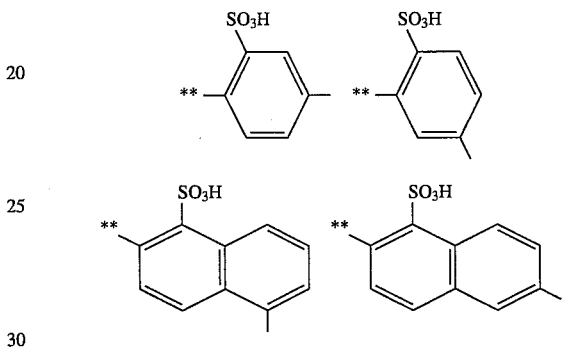

wherein the mark ** signifies a bond linking to —N=N—.

Examples of the group capable of being split by the action of an alkali, represented by Y, include sulfato, thiosulfato, phosphato, acetoxy, halo and the like, among which sulfato is preferable.

As the unsubstituted or substituted alkyl represented by R, $R_1$, $R_2$ and $R_7$, alkyl having 1 to 4 carbon atoms are preferable. As the substituent, hydroxy, cyano, alkoxy, halo, carbamoyl, carboxy, alkoxycarbonyl, alkylcarbonyloxy, sulfo and sulfamoyl are preferable.

Preferable specific examples of R, $R_1$, $R_2$ and $R_7$ include the followings: hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl. Among these groups, hydrogen is particularly preferable as $R_1$, hydrogen, methyl and ethyl are particularly preferable $R_2$ and $R_7$, and hydrogen and methyl are particularly preferable as R.

Preferable examples of the unsubstituted or substituted alkyl represented by $R_3$, $R_4$, $R_5$ and R include alkyl having 1 to 4 carbon atoms unsubstituted or substituted once or twice by a substituent selected from the group consisting of alkoxy having 1 to 4 carbon atoms, sulfo, carboxy, hydroxy, chloro, phenyl, cyano and sulfato.

Among them, more preferable are methyl, ethyl, n-propyl, iso-propyl, n-butyl, iso-butyl, sec-butyl, β-hydroxyethyl, β-sulfatoethyl, β-sulfoethyl, β-methoxyethyl, β-ethoxyethyl, β-chloroethyl, β-carboxyethyl and the like.

Preferable examples of the unsubstituted or substituted phenyl represented by $R_3$, $R_4$, $R_5$ and $R_6$ include phenyl unsubstituted or substituted once or twice by a substituent selected from the group consisting of alkyl having 1 to 4 carbon atoms, alkoxy having 1 to 4 carbon atoms, sulfo, carboxy, chloro and bromo.

Among them, particularly preferable are phenyl, 2-, 3- or 4-sulfophenyl, 2,4- or 2,5-disulfophenyl, 2-, 3- or 4-carboxyphenyl, 2-, 3- or 4-chlorophenyl, 2-, 3- or 4-methylphenyl and 2-, 3- or 4-methoxyphenyl.

Preferable examples of the unsubstituted or substituted naphthyl represented by $R_3$, $R_4$, $R_5$ and $R_6$ include naphthyl unsubstituted or substituted once, twice or three times by a substituent selected from the group consisting-of hydroxy, carboxy, sulfo, alkyl having 1 to 4 carbon atoms, alkoxy having 1 to 4 carbon atoms and chloro.

Among them, particularly preferable are 2-, 3-, 4-, 5-, 6-, 7- or 8-sulfo-l-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

Preferable examples of the unsubstituted or substituted benzyl represented by $R_3$, $R_4$, $R_5$ and $R_6$ include benzyl unsubstituted or substituted once or twice by a substituent selected from the group consisting of alkyl having 1 to 4 carbon atoms, alkoxy having 1 to 4 carbon atoms, sulfo and chloro.

Among them, benzyl and 2-, 3- or 4-sulfobenzyl and the like are particularly preferable.

In the present invention, a case that one of $R_5$ and $R_6$ is hydrogen, methyl or ethyl and the other is phenyl unsubstituted or substituted by $C_{1-4}$ alkyl, $C_{1-4}$ alkoxy, sulfo, carboxy or halo is particularly preferable from the viewpoint of dyeing performances.

When B in formula (I) is a group represented by

examples of the compound represented by

used for forming such a group include the followings:
ammonia;
aromatic amines such as 1-aminobenzene, 1-amino-2-, -3- or -4-methylbenzene, 1-amino-3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-amino-phenylmethanesulfonic acid, 2-, 3- or 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-4-chlorobenzene, 1-ethylamino-3- or -4-methylbenzene, 1-(2-hydroxyethyl)-amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene- 1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-amino- naphthalene-2,7-disulfonic acid, 6-aminonaphthalene-1,3,5-trisulfonic acid, 7-aminonaphthalene-1,3,5trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid; and aliphatic amines such as methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis(2-hydroxyethyl)-amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine and 1-phenyl-2-propylamine.

Among these compounds, particularly preferable are aniline, N-methylaniline, N-ethylaniline, 2-, 3- or 4-chloroaniline, N-methyl-2-, -3- or -4-chloroaniline, N-ethyl-2-, -3- or -4-chloroaniline, 2-, 3- or 4-methylaniline, 2-, 3- or 4-sulfoaniline, aniline-2,4- or -2,5-disulfonic acid, 3- or 4-methylaminobenzenesulfonic acid, 3- or 4-ethylaminobenzenesulfonic acid, 2-, 3- or 4-carboxyaniline, taurine, N-methyltaurine, mono- or di-ethanolamine, and the like.

When B in formula (I) is a group represented by —OR$_3$, examples of the compound represented by R$_3$OH, used for forming such a group include the followings:

aromatic compounds such as phenol, 1-hydroxy-2-, -3- or -4-methylbenzene, 1-hydroxy-3,4- or -3,5-dimethylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3-hydroxybenzenesulfonic acid, 4-hydroxybenzenesulfonic acid, 5-hydroxybenzene-1,3-disulfonic acid, 6-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, 5-hydroxy-2-ethoxybenzenesulfonic acid, 2-hydroxynaphthalene-1-sulfonic acid, 4-hydroxynaphthalene-1-sulfonic acid, 5-hydroxynaphthalene-1-sulfonic acid, 6-hydroxynaphthalene-1-sulfonic acid, 7-hydroxynaphthalene-1-sulfonic acid, 8-hydroxynaphthalene-1-sulfonic acid, 1-hydroxynaphthalene-2-sulfonic acid, 4-hydroxynaphthalene-2-sulfonic acid, 5-hydroxynaphthalene-2-sulfonic acid, 6-hydroxynaphthalene-2-sulfonic acid, 7-hydroxynaphthalene-2-sulfonic acid, 8-hydroxynaphthalene-2-sulfonic acid, 4-hydroxynaphthalene-1,3-disulfonic acid, 5-hydroxynaphthalene-1,3-disulfonic acid, 6-hydroxynaphthalene-1,3-disulfonic acid, 7-hydroxynaphthalene-1,3-disulfonic acid, 8-hydroxynaphthalene-1,3-disulfonic acid, 2-hydroxynaphthalene-1,5-disulfonic acid, 3-hydroxynaphthalene-1,5-disulfonic acid, 4-hydroxynaphthalene-1,5-disulfonic acid, 4-hydroxynaphthalene-1,6-disulfonic acid, 8-hydroxynaphthalene-1,6-disulfonic acid, 4-hydroxynaphthalene-1,7-disulfonic acid, 3-hydroxynaphthalene-2,6-disulfonic acid, 4-hydroxynaphthalene-2,6-disulfonic acid, 3-hydroxynaphthalene-2,7-disulfonic acid, 4-hydroxynaphthalene-2,7-disulfonic acid, 6-hydroxynaphthalene-1,3,5-trisulfonic acid, 7-hydroxynaphthalene-1,3,5-trisulfonic acid and 4-hydroxynaphthalene-1,3,6-trisulfonic acid; and aliphatic compounds such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfatoethanol, glycolic acid, 3-hydroxypropanionic acid, benzyl alcohol, 2-, 3- or 4-chlorobenzyl alcohol, 4-methylbenzyl alcohol, 2-, 3- or 4-sulfobenzyl alcohol, 2-phenylethanol and 1-phenyl-2-propanol. When B in formula (I) is a group represented by —SR$_4$, examples of the compound represented by R$_4$SH, used for forming such a group include compounds having mercapto in place of the hydroxy in the above-mentioned compounds.

When B in formula (I) is

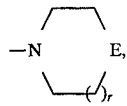

wherein r and E are as defined above, a case that r is 1 and E is CH$_2$ or O is preferable.

In the present invention, a case that B is a group represented by

is preferable.

When X is halo, X is preferably chloro or fluoro. When X is a pyridinio group having a substituent, examples of said substituent include carboxy, carbamoyl, sulfo, halo and unsubstituted or substituted alkyl having 1 to 4 carbon atoms. As examples of the substituted alkyl, β-hydroxyethyl, β-sulfoethyl and the like can be referred to. As the pyridinio group represented by X, carboxy- or carbamoyl-substituted pyridinio groups are preferable, among which carboxypyridinio is most preferable from the viewpoint of dyeing performances.

Preferable examples of the unsubstituted or substituted pyridine include pyridine, 2-, 3- or 4-carboxypyridine, 2-, 3- or 4-carbamoylpyridine, 3-sulfopyridine, 4-β-sulfoethylpyridine, 3-β-hydroxyethylpyridine, 4-chloropyridine, 3-methylpyridine, 3,5-dicarboxypyridine And the like. Among them, 3- or 4-carboxypyridine (nicotinic acid and isonicotinic acid) are particularly preferable.

When X is

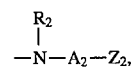

B is preferably a group represented by

The compounds of the present invention exist in the form of a free acid or a salt thereof. As the salt, alkali metal salts and alkaline earth metal salts are preferable, and sodium salts, potassium salts and lithium salts are particularly preferable.

In the present invention, preferred is one represented by the following formula in the free acid form,

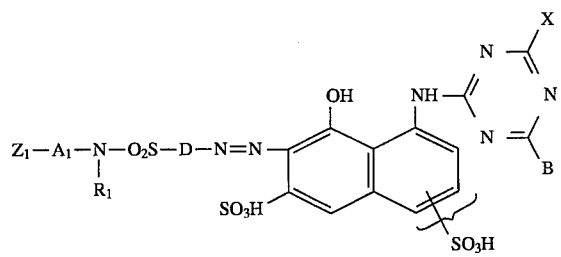

wherein Z$_1$, A$_1$, R$_1$, D, X and B are as defined above.

The compounds of the present invention can be produced, for example, in the following manner. Thus, a compound represented by the following formula (II) in the free acid form:

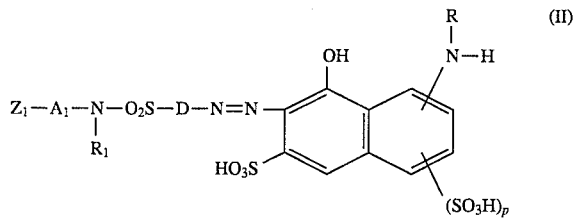

wherein D, $A_1$, $Z_1$, $R_1$, R and p are as defined above, and any one of compounds represented by the following formulas (III) to (VII)

$$HOR_3 \quad (III)$$
$$HSR_4 \quad (IV)$$
$$HNR_5R_6 \quad (V)$$

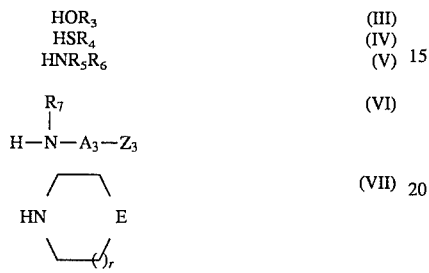

wherein $R_3$, $R_4$, $R_5$, $R_6$, $R_7$, $A_3$, $Z_3$, r and E are as defined above, are subjected to a condensation reaction with 2,4,6-trihalogeno-s-triazine in an arbitrary order to obtain a compound of formula (I) wherein X is halo. The compound thus obtained is subjected to a further condensation reaction with an unsubstituted or substituted pyridine compound or a compound represented by

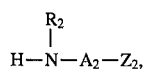

wherein $R_2$, $A_2$ and $Z_2$ are as defined above, whereby a compound of formula (I) wherein X is pyridinio or a group represented by

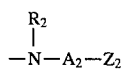

wherein $R_2$, $A_2$ and $Z_2$ are as defined above can be obtained.

In the present invention, the compound of formula (II) can be obtained by a coupling reaction between a compound of the following formula (VIII):

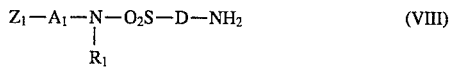

and a compound of the following formula (IX):

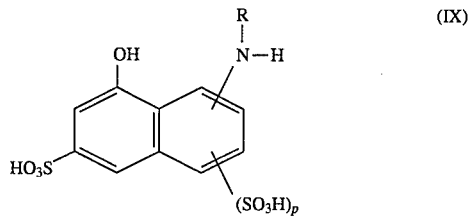

wherein $Z_1$, $A_1$, $R_1$, D, R and p are as defined above.

Alternatively, the compound of the present invention can be produced in the following manner, too. Thus, a compound represented by formula (IX) and any one of the compounds represented by formulas (III) to (VII) are subjected to a condensation reaction with 2,4,6-trihalogeno-s-triazine in an arbitrary order to obtain a compound of the following formula (X):

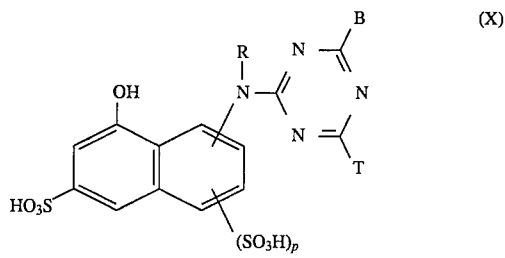

wherein T represents halo; and R, B and p are as defined above. Then, it is coupled with a diazo compound of the compound (VIII), whereby there is obtained a compound of formula (I) wherein X is halo. If the compound obtained above is further condensed with a pyridine compound or a compound represented by

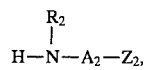

wherein $R_2$, $A_2$ and $Z_2$ are as defined above, there is obtained a compound of formula (I) wherein X is a unsubstituted or substituted pyridine or

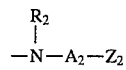

wherein $R_2$, $A_2$ and $Z_2$ are as defined above.

It is also possible to obtain a compound represented by formula (I) wherein X is unsubstituted or substituted pyridinio or

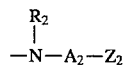

wherein $R_2$, $A_2$ and $Z_2$ are as defined above, by subjecting a compound represented by formula (IX), any one of the compounds represented by formulas (III) to (VII) and a pyridine compound or a compound represented by

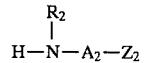

wherein $R_2$, $A_2$ and $Z_2$ are as defined above, to a condensation reaction with 2,4,6-trihalogeno-s-triazine to obtain a compound represented by the following formula (XI):

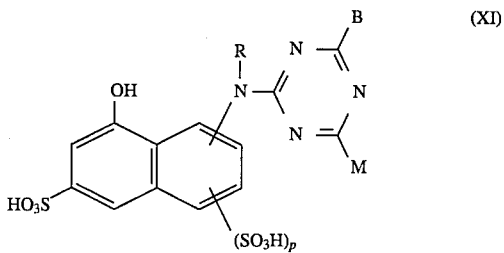

wherein M is unsubstituted or substituted pyridinio or

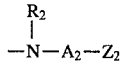

wherein $R_2$, $A_2$ and $Z_2$ are as defined above, and R, B and p are as defined above, followed by coupling it with a diazonium compound of a compound represented by formula (VIII).

As 2,4,6-trihalogeno-s-triazine, cyanuric chloride and cyanuric fluoride are particularly preferable.

In the condensation reaction with 2,4,6-trihalogeno-s-triazine, the order of the reactions is not critical. If the yield and quality of compound (I) is taken into consideration, it is preferable to react 2,4,6-trihalogeno-s-triazine firstly with a compound of lower reactivity. Although the conditions of the reactions are not critical, it is usual to carry out the reaction primarily at a temperature of −10° C. to 40° C. at pH 2–9, secondarily at a temperature of 0° C. to 70° C. at pH 2–9 and tertiarily, when a tertiary reaction is carried out, at a temperature of 10° C. to 100° C. at pH 2–9. Thereby, a compound of formula (I) or a salt thereof can be obtained.

Examples of the compound represented by formula (VIII) include the followings:
1-sulfo-2-aminonaphthalene-5-[N-(4'-β'-sulfatoethylsulfonyl) -phenyl]-sulfonamide,
1-sulfo-2-aminonaphthalene-5-[N-(3'-β'-sulfatoethylsulfonyl) -phenyl]-sulfonamide,
1-sulfo-2-aminonaphthalene-5-[N-ethyl-N-(4'-β'-sulfatoethylsulfonyl) -phenyl]-sulfonamide,
1-sulfo-2-aminonaphthalene-5-[N-ethyl-N-(3'-β'-sulfatoethylsulfonyl) -phenyl]-sulfonamide,
1-sulfo-2-aminonaphthalene-5-[N-(2'-methoxy-5'-β'-sulfatoethylsulfonyl)-phenyl]-sulfonamide,
1-sulfo-2-aminonaphthalene-5-[N-(2'-methoxy-5'-β'methyl-4'-β'-sulfatoethylsulfonyl)-phenyl]-sulfonamide,
1-sulfo-2-aminonaphthalene-5-[N-(4'-methoxy-3'-β'-sulfatoethylsulfonyl)-phenyl]-sulfonamide,
1-sulfo-2-aminonaphthalene-5-[N-2'-(6'-β'-sulfatoethylsulfonyl)-naphthyl]-sulfonamide,
1-sulfo-2-aminonaphthalene-5-[N-2'-(5'-β'-sulfatoethylsulfonyl)-naphthyl]-sulfonamide,
1-sulfo-2-aminonaphthalene-5-[N-2'-(6'-sulfo-8'-β'-sulfatoethylsulfonyl)-naphthyl)]-sulfonamide,
1-sulfo-2-aminonaphthalene-5-[N-2'-(β'-sulfatoethylsulfonyl)-ethyl]-sulfonamide,
1-sulfo-2-aminonaphthalene-5-[N-3'-(β'-sulfatoethylsulfonyl)-Propyl]-sulfonamide,
1-sulfo-2-aminonaphthalene-5-{N-2'-[2'-(β'-sulfatoethylsulfonyl)-ethoxy]-ethyl}-sulfonamide,
3-sulfo-4-amino-N'-[(3'-β'-sulfatoethylsulfonyl)-phenyl]-benzenesulfonamide,
3-sulfo-4-amino-N'-[(4'-β'-sulfatoethylsulfonyl)-phenyl]-benzenesulfonamide,
3-sulfo-4-amino-N'-ethyl-N'-[(3'-β'-sulfatoethylsulfonyl)-phenyl]-benzenesulfonamide,
3-sulfo-4-amino-N'-ethyl-N'-[(4'-β'-sulfatoethylsulfonyl)-phenyl]-benzenesulfonamide,
3-sulfo-4-amino-N'-[(2'-methoxy-5'-β'-sulfatoethylsulfonyl)-phenyl]-benzenesulfonamide,
3-sulfo-4-amino-N'-[(2'-methoxy-5'-methyl-4'-β'-sulfatoethylsulfonyl)-phenyl]-benzenesulfonamide,
3-sulfo-4-amino-N'-[(4'-methoxy-3'-β'-sulfatoethylsulfonyl)-phenyl]-benzenesulfonamide,
3-sulfo-4-amino-N -[2'-(β'-sulfatoethylsulfonyl)-ethyl]-benzenesulfonamide,
3-sulfo-4-amino-N -[3'-(β'-sulfatoethylsulfonyl)-propyl]-benzenesulfonamide,
3-sulfo-4-amino-N -{2'-[2'-(β'-sulfatoethylsulfonyl)-ethoxy]-ethyl}-benzenesulfonamide,
4-sulfo-5-amino-N -[(3'-β'-sulfatoethylsulfonyl)-phenyl]-benzenesulfonamide,
4-sulfo-5-amino-N -[(4'-β'-sulfatoethylsulfonyl)-phenyl]-benzenesulfonamide,
4-sulfo-5-amino-N -ethyl-N'-[(3'-β'-sulfatoethylsulfonyl)-phenyl]-benzenesulfonamide,
4-sulfo-5-amino-N'-ethyl-N'-[(4'-β'-sulfatoethylsulfonyl)-phenyl]-benzenesulfonamide,
4-sulfo-5-amino-N'-[(2'-methoxy-5'-β'-sulfatoethylsulfonyl)-phenyl]-benzenesulfonamide,
4-sulfo-5-amino-N'-[(2'-methoxy-5'-methyl-4'-β'-sulfatoethylsulfonyl)-phenyl]-benzenesulfonamide,
4-sulfo-5-amino-N'-[(4'-methoxy-3'-β'-sulfatoethylsulfonyl)-phenyl]-benzenesulfonamide,
4-sulfo-5-amino-N'-[2'-(β'-sulfatoethylsulfonyl)-ethyl]-benzenesulfonamide,
4-sulfo-5-amino-N'-[3'-(β'-sulfatoethylsulfonyl)-propyl]-benzenesulfonamide,
4-sulfo-5-amino-N'-{2'-[2'-(β'-sulfatoethylsulfonyl)ethoxy] -ethyl}-benzenesulfonamide, and the like.

The compounds represented by formula (VIII) can be produced, for example, in the following manner. Thus, a condensation reaction between compounds of the following formulas (XII) and (XIII):

$$ClO_2S-D-NH-W \quad (XII)$$

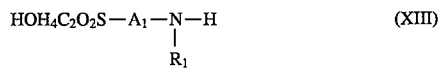

$$HOH_4C_2O_2S-A_1-\underset{R_1}{N}-H \quad (XIII)$$

wherein W represents H or a protecting group of amino group, and D, $A_1$ and $R_1$ are as defined above, is firstly carried out, and subsequently, if desired, the product is isolated to obtain a compound of the following formula (XIV):

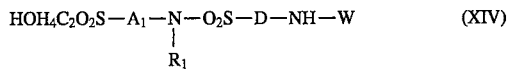

$$HOH_4C_2O_2S-A_1-\underset{R_1}{N}-O_2S-D-NH-W \quad (XIV)$$

which is a precursor of the compound of formula (VIII). The precursor (XIV) can be converted to compound (VIII) by a known method.

Thus, the β-hydroxyethylsulfonyl group can be converted to its ester derivative such as sulfato group, phosphato group, thiosulfato group or acetoxy group or halogeno such as chloro. As examples of the esterifying agent or acylating agent successfully usable for his purpose, the corresponding inorganic or organic acids or their anhydrides or halides, such as sulfuric acid, sulfur trioxide-containing sulfuric acid, chlorosulfonic acid, phosphoric acid, phosphoric acid oxychloride, mixture of phosphoric acid and phosphorus pentoxide, acetic anhydride, toluenesulfonyl chloride, thionyl chloride and the like can be referred to.

The conversion of β-hydroxyethylsulfonyl group into a vinylsulfonyl group can be achieved by treating an analogous ester derivative of β-hydroxyethylsulfonyl group in an aqueous medium at pH 10–12, at a temperature of 40° C. to 50° C. for a period of 10–20 minutes.

As the protecting group W of the amino group, acetyl group and the like can be referred to. The protecting group can be split off by a treatment in an acidic aqueous medium at a temperature of 50° C. to 90° C.

Examples of the acid chloride represented by formula (XII), wherein W is hydrogen, include the followings:
2-, 3- or 4-aminobenzenesulfonyl chloride,
3-methyl-4-aminobenzenesulfonyl chloride,
3-ethyl-4-aminobenzenesulfonyl chloride,
2-methyl-5-aminobenzenesulfonyl chloride,
2-ethyl-5-aminobenzenesulfonyl chloride,
4-methoxy-3-aminobenzenesulfonyl chloride,
4-ethoxy-3-aminobenzenesulfonyl chloride,
2-methoxy-5-aminobenzenesulfonyl chloride,
2,4-dimethyl-5-aminobenzenesulfonyl chloride,
2,5-dimethoxy-4-aminobenzenesulfonyl chloride,
2,4-dimethoxy-5-aminobenzenesulfonyl chloride, 3-methoxy-6-methyl-4-aminobenzenesulfonyl chloride,
3-chloro-4-aminobenzenesulfonyl chloride,
3-bromo-4-aminobenzenesulfonyl chloride,
3-sulfo-4-aminobenzenesulfonyl chloride,
4-sulfo-3-aminobenzenesulfonyl chloride,
2-aminonaphthalene-8-sulfonyl chloride,
2-aminonaphthalene-6-sulfonyl chloride,
2-aminonaphthalene-5-sulfonyl chloride,
1-aminonaphthalene-4-sulfonyl chloride,
1-sulfo-2-aminonaphthalene-6-sulfonyl chloride,
6-sulfo-2-aminonaphthalene-8-sulfonyl chloride,
8-sulfo-2-aminonaphthalene-6-sulfonyl chloride,
1-sulfo-2-aminonaphthalene-5-sulfonyl chloride, and the like.

Among these compounds, preferable are 3-sulfo-4-aminobenzenesulfonyl chloride, 4-sulfo-3-aminobenzenesulfonyl chloride, 1-sulfo-2-aminonaphthalene-5-sulfonyl chloride and 1-sulfo-2-aminonaphthalene-6-sulfonyl chloride.

Examples of the compound represented by formula include the followings:
4-aminobenzene-β-hydroxyethyl sulfone,
3-aminobenzene-β-hydroxyethyl sulfone,
2-(β-hydroxyethylsulfonyl)-ethylamine,
3-(β-hydroxyethylsulfonyl)-propylamine,
2-[2-(β-hydroxyethylsulfonyl)-ethoxy]ethylamine,
and the like.

The compound represented by formula (VIII) can be produced by the following method, too. Thus, it can be produced by subjecting a compound of the following formula (XV):

$$Z_1-A_1-N-H \quad\quad\quad (XV)$$
$$\quad\quad\quad | $$
$$\quad\quad\quad R_1$$

wherein $Z_1$, $A_1$ and $R_1$ are as defined above, and a compound of the above-mentioned formula (XII) to a condensation reaction and subsequently, if desired, splitting off the in an protecting group W of the amino group by a treatment acidic medium at a temperature of 50° C. to 90° C.

Examples of the compound represented by formula (XV) include the followings:
4-aminobenzene-β-sulfatoethylsulfonyl,
3-aminobenzene-β-sulfatoethylsulfonyl,
2-(β-sulfatoethylsulfonyl)-ethylamine,
3-(β-sulfatoethylsulfonyl)-propylamine,
2-[2-(β-sulfatoethylsulfonyl)-ethoxy]-ethylamine,
and vinyl compounds of these compounds.

Examples of the compound represented by formula (IX) include the followings:
2-amino-5-naphthol-7-sulfonic acid,
2-amino-5-naphthol-1,7-disulfonic acid,
1-amino-5-naphthol-7-sulfonic acid,
2-amino-8-naphthol-6-sulfonic acid,
2-amino-8-naphthol-3,6-disulfonic acid,
2-amino-8-naphthol-4,6-disulfonic acid,
1-amino-8-naphthol-3,6-disulfonic acid,
1-amino-8-naphthol-4,6-disulfonic acid,
2-methylamino-5-naphthol-7-sulfonic acid,
2-methylamino-8-naphthol-6-sulfonic acid,
and the like.

Among these compounds, 1-amino-8-naphthol-3,6-disulfonic acid and 1-amino-8-naphthol-4,6-disulfonic acid are preferable.

The compounds of the present invention have a fiber-reactivity and can be used for dyeing or printing hydroxy group- or carbonamide group-containing materials. Preferably, the material to be dyed or printed is used in the form of a fiber material or a mixed woven material thereof.

Said hydroxy group-containing material includes natural and synthetic hydroxy group-containing materials such as cellulose fiber materials, their regenerated products and polyvinyl alcohol. As the cellulose fiber material, cotton and other plant fibers such as linen, flax, jute and ramie fibers are preferable. As the regenerated cellulose fiber, viscose staple and filament viscose can be referred to.

Said carbonamide group-containing material includes synthetic and natural polyamides and polyurethanes. Particularly in the form of a fiber, it includes wool and other animal furs, silk, leather, polyamide-6,6, polyamide-6, polyamide-11 and polyamide-4.

The compounds of the present invention can be used for dyeing or printing said materials, particularly those such as fiber materials, in a manner depending on physical and chemical properties of the material. The manner includes, for example, exhaustion dyeing, padding and printing methods.

For example, the exhaustion dyeing method can be carried out at a relatively low temperature in the presence of an acid binding agent such as sodium carbonate, sodium tertiary phosphate, sodium hydroxide and the like and, if desired, a neutral salt such as sodium sulfate and sodium chloride optionally together with dissolving assistants, penetrants or level dyeing agents. The neutral salt which can be used for promoting the exaustion of the dye may be added either after the intended dyeing temperature has been reached or before it, optionally in portions.

The padding method can be carried out by padding the materials at room or elevated temperature, followed by drying and then steaming or dry-heating the padded materials to perform dye fixation.

The printing can be carried out in a one-phase or two-phase manner. The one-phase printing may be conducted by printing the fiber-materials with a printing paste containing an acid-binding agent such as sodium bicarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium aliginate or starch ether is used optionally together with a conventional printing assistant such as urea and/or a dispersant.

As examples of the acid binding agent suitable for fixing the compound of the present invention onto cellulose fiber, water-soluble basic salts formed between an alkali metal or an alkaline earth metal and an inorganic or organic acid or a compound liberating alkali in a heated state can be referred to. Particularly, alkali metal salts formed between an alkali metal hydroxide and an inorganic or organic acid of weak or medium strength are preferable, among which sodium salts and potassium salts are most preferable. Examples of such acid binding agent include sodium hydroxide, potassium hydroxide, sodium bicarbonate, sodium carbonate, sodium formate, potassium carbonate, sodium primary, secondary and tertiary phosphates, sodium silicate, sodium trichloroacetate and the like.

The dyeing of synthetic and natural polyamide and polyurethane fibers can be carried out by performing exhaustion in an acid or weak acid bath at a controlled pH value and then making the bath neutral or in some cases alkaline to perform fixation. The dyeing temperature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonic acid or an addition product between stearylamine and ethylene oxide.

The compound of the present invention is characterized in that it exhibits excellent performances in dyeing and printing fiber materials. It is particularly useful for dyeing cellulose fiber materials, and gives a dyed product excellent in light fastness, perspiration-light fastness, wet fastnesses such as washing resistance, peroxide-washing resistance, perspiration resistance, and hydrolysis resistance and alkali resistance, and particularly in abrasion fastness and iron fastness.

It is further characterized by excellency in build-up, level-dyeing and wash-off properties and high solubility as well as high exhaustion and fixation percentages. Moreover, it is characterized in that it is hardly affected by changes in dyeing temperature and dyeing bath ratio, so that a dyed product with a stable quality can be obtained.

Moreover, the compound of the present invention is characterized in that it is resistance to color change at the time of fixing treatment and resin treatment of dyed product and resistant to the change due to contact with basic substances during storage.

The present invention will be illustrated in more detail by way of the following examples, wherein parts and % are by weight.

EXAMPLE 1

3-Aminobenzene-β-sulfatoethylsulfonyl (281 parts) was dissolved into an aqueous medium at a controlled pH of 5–7. Then, 1-sulfo-2-aminonaphthalene- 5-sulfonyl chloride (321 parts) was slowly added thereto, while adjusting temperature to 0°–30° C. and pH to 5–7. Further, the reaction was completed under the same conditions as above. Then, the product was isolated in the conventional manner to obtain 1-sulfo-2-aminonaphthalene-5-[N-(3'-β'-sulfatoethylsulfonyl)-phenyl]-sulfonamide.

On the other hand, cyanuric chloride (184.5 parts) was successively condensed with 1-amino-8-naphthol-3,6-disulfonic acid (319.3 parts) and aniline (93 parts) in the conventional manner to obtain a di-condensation product shown by the following formula:

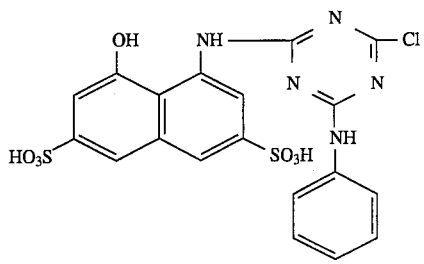

Then, 1-sulfo-2-aminonaphthalene-5-[N-(3'-β'-sulfatoethylsulfonyl)-phenyl]-sulfonamide (566.6 parts) synthesized above was diazotized to the usual manner and coupled firstly with the di-condensation product of the above formula and subsequently with nicotinic acid (123 parts). The compound thus obtained was salted out with sodium chloride and isolated to obtain a monoazo compound represented by the following formula in the free acid form:

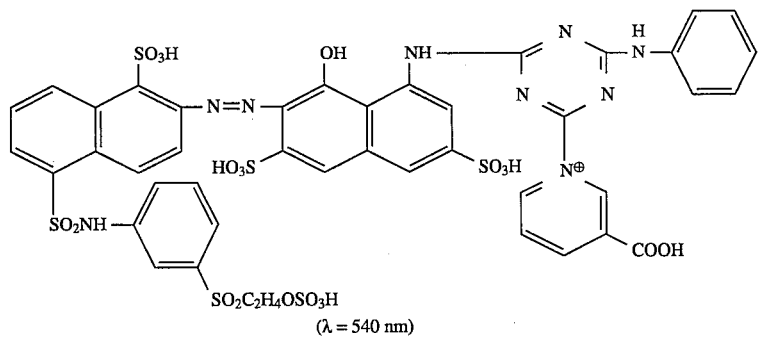

(λ = 540 nm)

EXAMPLE 2

Example 1 can be repeated, except that the 1-sulfo-2-aminonaphthalene-5-[N-(3'-β'-sulfatoethylsulfonyl)-phenyl]-sulfonamide, 1-amino-8-naphthol-3,6disulfonic acid, aniline and nicotinic acid used in Example 1 are replaced with the compounds of Column 2, Column 3, Column 4 and Column 5, respectively, of the following table to obtain the corresponding monoazo compounds, and provided that "-" in column 5 means no use of pyridine derivatives. When used for dyeing, they give dyed products of which hues are as shown in Column 6 of the table.

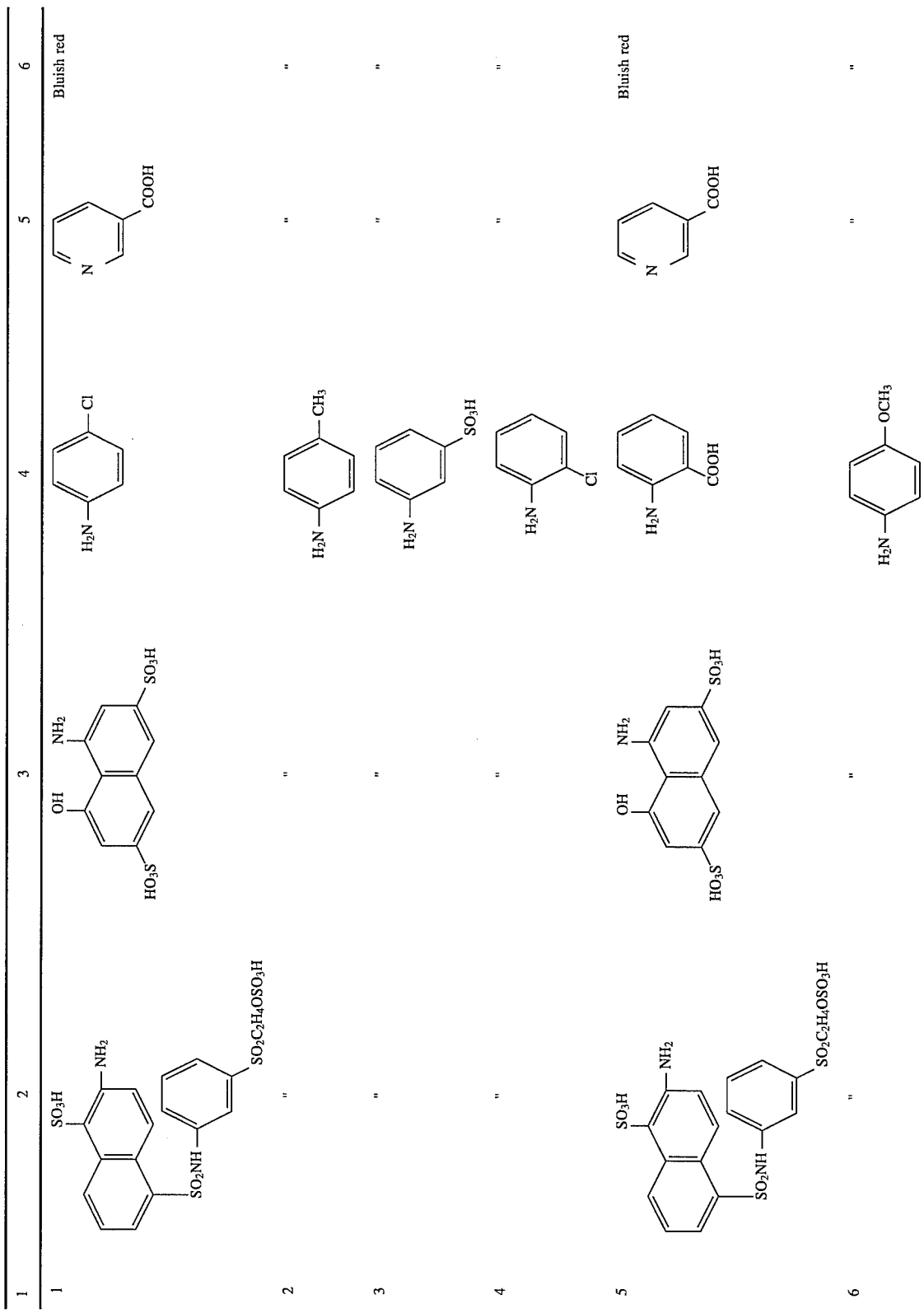

| 1 | 2 | 3 | 4 | 5 | 6 |
|---|---|---|---|---|---|
| 7 | naphthalene with SO₃H, NH₂, SO₂NH-phenyl-SO₂C₂H₄OSO₃H | " | HN(CH₃)-phenyl | " | " |
| 8 | " | " | HN(C₂H₅)-(4-Cl-phenyl) | " | " |
| 9 | naphthalene with SO₃H, NH₂, SO₂NH-(m-phenyl)-SO₂CH=CH₂ | 8-amino-5-hydroxy-naphthalene-2,7-disulfonic acid (NH₂, OH, 2×SO₃H) | H₂N-(2-OCH₃-phenyl) | pyridine-COOH | Bluish red |
| 10 | naphthalene with SO₃H, NH₂, SO₂NH-(4-OCH₃-phenyl)-SO₂C₂H₄OSO₃H | " | H₂N-(4-C₂H₅-phenyl) | " | " |

-continued

| 1 | 2 | 3 | 4 | 5 | 6 |
|---|---|---|---|---|---|
| 11 | phenyl with SO₃H, NH₂, and SO₂NH-phenyl-SO₂C₂H₄OSO₃H | " | 4-chloroaniline (H₂N-C₆H₄-Cl) | " | Red |
| 12 | " | " | " | pyridine-4-COOH | " |
| 13 | phenyl with SO₃H, NH₂, OCH₃, and SO₂NH-phenyl-SO₂C₂H₄OSO₃H | " | 2-methylaniline (H₂N-C₆H₄-CH₃) | pyridine-3-CONH₂ | Red |
| 14 | naphthyl with SO₃H, NH₂, and SO₂NH-phenyl-SO₂C₂H₄OSO₃H | 1-amino-8-hydroxy-naphthalene-3,6-disulfonic acid (H-acid) | 3-(β-sulfatoethylsulfonyl)aniline (H₂N-C₆H₄-SO₂C₂H₄OSO₃H) | pyridine-3-COOH | Bluish red |
| 15 | " | " | 4-(β-sulfatoethylsulfonyl)aniline (H₂N-C₆H₄-SO₂C₂H₄OSO₂H) | " | " |

-continued

| 1 | 2 | 3 | 4 | 5 | 6 |
|---|---|---|---|---|---|
| 16 | naphthalene with NH₂, SO₃H, SO₂NHC₃H₆SO₂C₂H₄OSO₃H | " | H₂N–C₆H₄–SO₂CH=CH₂ (para) | pyridine-4-CONH₂ | " |
| 17 | naphthalene with NH₂, SO₃H, SO₂NH–C₆H₄–SO₂C₂H₄OSO₃H (para) | 4-amino-5-hydroxy-naphthalene-2,7-disulfonic acid | 3-amino-4-chloro-C₆H₃–SO₂C₂H₄OSO₃H | pyridine-4-COOH | Bluish red |
| 18 | " | 4-amino-5-hydroxy-naphthalene-1,7-disulfonic acid | H₂N–C₆H₄–SO₂CH=CH₂ (meta) | " | Red |
| 19 | naphthalene with NH₂, SO₃H, SO₂NH–C₆H₄–SO₂C₂H₄OSO₃H (meta) | " | H₂N–C₆H₄–SO₂C₂H₄OSO₃H (para) | " | " |
| 20 | naphthalene with NH₂, SO₃H, SO₂NHC₂H₄SO₂C₂H₄OSO₃H | 4-amino-5-hydroxy-naphthalene-2,7-disulfonic acid | H₂N–C₆H₄–SO₂C₂H₄OSO₃H (meta) | pyridine-4-COOH | Bluish red |

| 1 | 2 | 3 | 4 | 5 | 6 |
|---|---|---|---|---|---|
| 21 | 1-SO₃H, 2-NH₂, 5-SO₂NHC₃H₆SO₂C₂H₄OSO₃H naphthalene | " | 4-(SO₂C₂H₄OSO₃H), 1-NH₂ benzene | " | " |
| 22 | 1-SO₃H, 2-NH₂, 5-SO₂NH-(3-SO₂C₂H₄OSO₃H-phenyl) naphthalene | " | 3-(SO₂C₂H₄OSO₃H), 1-NH₂ benzene | — | " |
| 23 | 1-SO₃H, 2-NH₂, 4-SO₂NH-(4-SO₂C₂H₄OSO₃H-phenyl) benzene | 8-NH₂, 5-OH, 2,7-di-SO₃H naphthalene | 3-(SO₂C₂H₄OSO₃H), 1-NH₂ benzene | — | Red |
| 24 | " | " | 7-NH₂, 1-(SO₂C₂H₄OSO₃H), 3-SO₃H naphthalene | " | " |

| 1 | 2 | 3 | 4 | 5 | 6 |
|---|---|---|---|---|---|
| 25 | 2-amino-1-sulfo-5-(3-(β-sulfatoethylsulfonyl)phenylsulfonamido)naphthalene | 7-amino-1-hydroxy-3-sulfonaphthalene | 4-amino-(4-β-sulfatoethylsulfonyl)aniline | " | Orange |
| 26 | " | 6-amino-1-hydroxy-3-sulfonaphthalene | 2-amino-toluene | nicotinic acid (3-COOH pyridine) | " |
| 27 | 2-amino-1-sulfo-5-(3-(β-sulfatoethylsulfonyl)phenylsulfonamido)naphthalene | 6-(N-methylamino)-1-hydroxy-3-sulfonaphthalene | 4-chloroaniline | nicotinic acid | Orange |
| 28 | 2-amino-1-sulfo-3-methoxy-5-(2-methyl-4-β-sulfatoethylsulfonyl)phenylsulfonamido-benzene | 4-amino-5-hydroxy-2,7-disulfonaphthalene | aniline | " | Red |

-continued

| 1 | 2 | 3 | 4 | 5 | 6 |
|---|---|---|---|---|---|
| 29 | ![structure] | ![structure] | ![morpholine] | ![nicotinic acid] | Blush red |
| 30 | " | " | ![piperidine SO2] | " | " |
| 31 | ![structure] | " | ![morpholine] | " | " |
| 32 | ![structure] | " | | | |
| 33 | ![structure] | ![structure] | ![cyclohexylamine] | ![nicotinic acid] | Bluish red |

-continued

| 1 | 2 | 3 | 4 | 5 | 6 |
|---|---|---|---|---|---|
| 34 | " | " | pyrrolidine (HN⟨⟩) | | " |
| 35 | " | " | 2-aminobenzoic acid (H₂N-C₆H₄-COOH) | | " |
| 36 | " | " | N-ethylaniline (C₂H₅-NH-C₆H₅) | | " |
| 37 | " | " | 2-bromoaniline (H₂N-C₆H₄-Br) | | " |
| 38 | SO₃H / NH₂ / SO₂NHC₂H₄SO₂C₂H₄OSO₃H (naphthalene) | NH₂ / OH / SO₃H / SO₃H (naphthalene) | 2-methylaniline (H₂N-C₆H₄-CH₃) | nicotinic acid (pyridine-COOH) | Bluish red |
| 39 | " | " | 2-aminobenzoic acid (H₂N-C₆H₄-COOH) | pyridine | " |
| 40 | " | " | 3-aminophenyl-SO₂C₂H₄OSO₃H (H₂N-C₆H₄-SO₂C₂H₄OSO₃H) | | " |

EXAMPLE 3

Cyanuric chloride (184.5 parts) and methanol (32 parts) were subjected to a condensation reaction in the usual manner, and then reacted with 1-amino-8-naphthol-3,6-disulfonic acid (319.3 parts) in a weakly acidic aqueous medium to obtain a di-condensation product shown by the following formula:

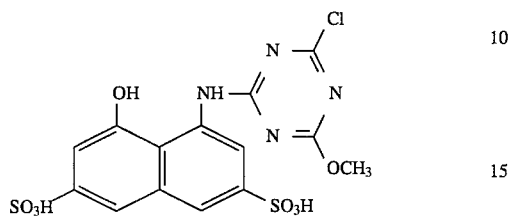

On the other hand, 1-sulfo-2-aminonaphthalene-5-[N-(3'-β'-sulfatoethylsulfonyl)-phenyl]-sulfonamide (566.6 parts) was diazotized in the usual manner and then coupled with the di-condensation product shown by the above formula and subsequently condensed with nicotinic acid (123 parts). The compound thus formed was salted out with sodium chloride and isolated to obtain a monoazo compound represented by the following formula in the free acid form:

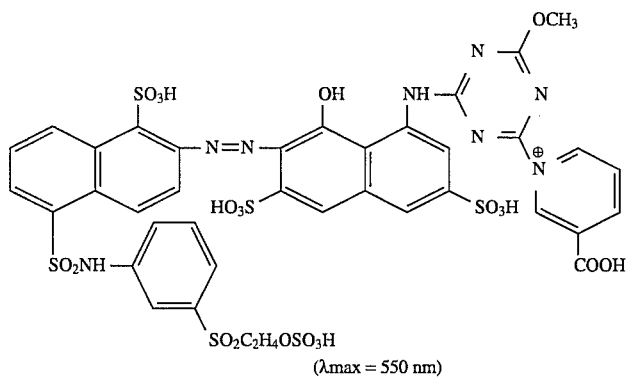

(λmax = 550 nm)

EXAMPLE 4

Example 3 can be repeated, except that the 1-sulfo-2-aminonaphthalene-5-[N-(3'-β'-sulfatoethylsulfonyl)-phenyl]-sulfonamide, 1-amino-8-naphthol-3,6disulfonic acid, methanol and nicotinic acid used in Example 3 are replaced with the compounds of Column 2, Column 3, Column 4 and Column 5 of the following table, respectively, to obtain the corresponding monoazo compounds. When used for dyeing, they give dyed products of which hues are as shown in Column 6 of the table.

| 1 | 2 | 3 | 4 | 5 | 6 |
|---|---|---|---|---|---|
| 1 | 2-amino-5-sulfo-8-(3-sulfatoethylsulfonylphenylsulfonamido)naphthalene | 1-amino-8-hydroxy-3,6-disulfonaphthalene (H-acid) | HOCH(CH$_3$)$_2$ | nicotinic acid (3-pyridinecarboxylic acid) | Bluish red |
| 2 | " | " | HOC$_2$H$_5$ | " | " |
| 3 | " | " | phenol | " | " |
| 4 | " | " | 2-chlorophenol | " | " |
| 5 | " | " | 2-methylphenol (o-cresol) | nicotinic acid | Bluish red |
| 6 | " | " | 2-methoxyphenol (guaiacol) | " | " |

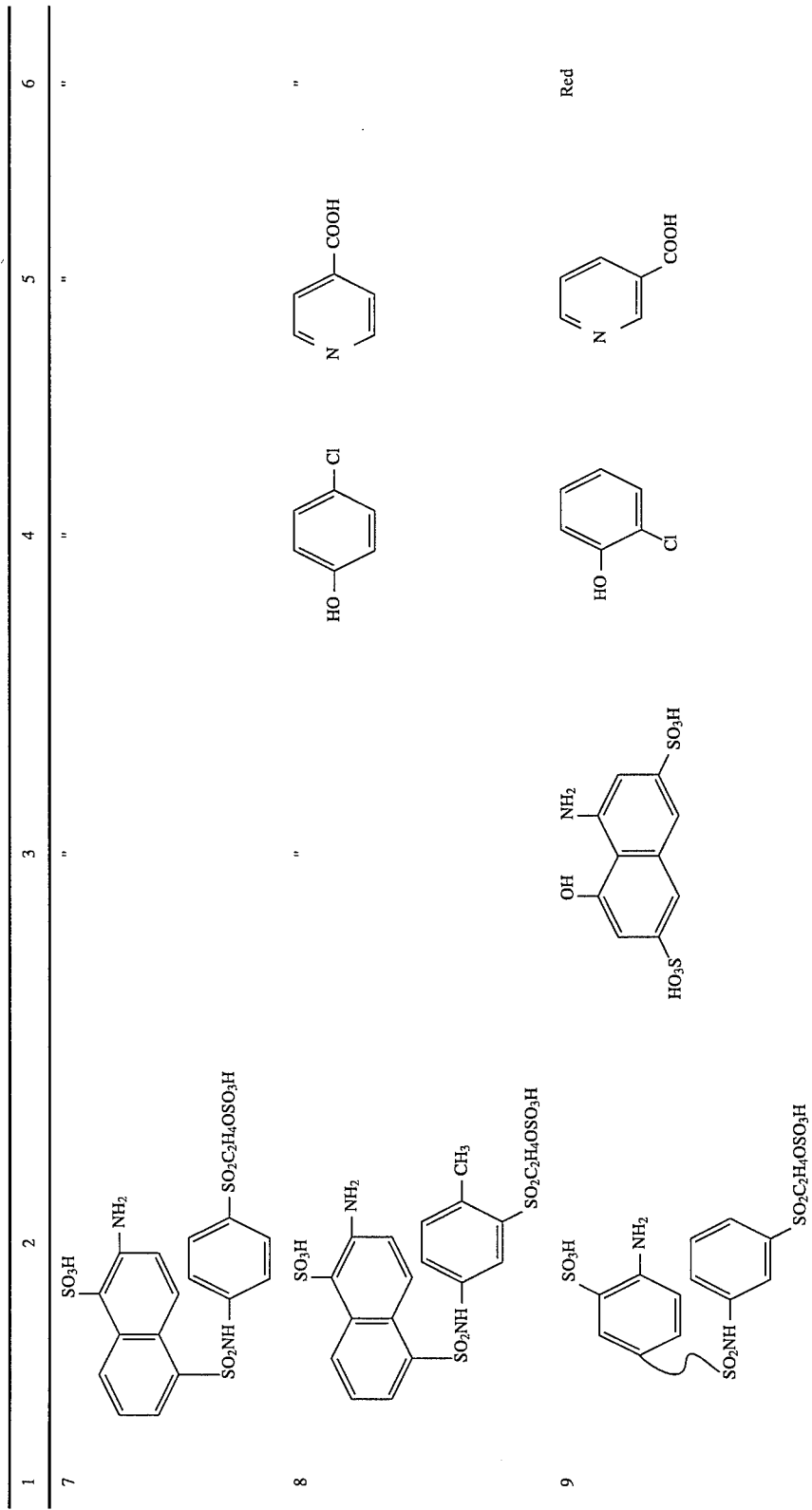

-continued

| 1 | 2 | 3 | 4 | 5 | 6 |
|---|---|---|---|---|---|
| 10 | ![structure with SO₃H, NH₂, OCH₃, SO₂NH, SO₂C₂H₄OSO₃H] | " | ![4-methylphenol: HO-C₆H₄-CH₃] | " | " |
| 11 | ![structure with SO₃H, NH₂, SO₂NH, SO₂C₂H₄OSO₃H] | " | " | " | " |
| 12 | ![naphthalene with SO₃H, NH₂, SO₂NHC₂H₄SO₂C₂H₄OSO₃H] | " | " | " | " |
| 13 | " | ![naphthalene with NH₂, OH, SO₃H, HO₃S] | ![phenol with HOCH(CH₃)₂ and OCH₃] | ![pyridine-3-COOH] | Bluish red |
| 14 | ![naphthalene with SO₃H, NH₂, SO₂NHC₂H₄OC₂H₄SO₂C₂H₄OSO₃H] | " | " | " | " |

-continued

| 1 | 2 | 3 | 4 | 5 | 6 |
|---|---|---|---|---|---|
| 15 | ![structure] NH₂, SO₃H, SO₂NH-, SO₂C₂H₄OSO₃H | " | ![phenyl] HS- | " | " |
| 16 | " | ![naphthalene] NH₂, OH, SO₃H | ![phenyl] HO- | ![pyridine] COOH | Yellowish red |
| 17 | ![structure] NH₂, SO₃H, SO₂NH-, SO₂C₂H₄OSO₃H | ![naphthalene] NH₂, OH, SO₃H, SO₃H | ![benzene] SO₃H, H₂N, SO₃H | ![pyridine] COOH | Bluish red |
| 18 | " | " | ![aniline] SO₃H, H₂N | " | " |
| 19 | ![naphthalene] NH₂, SO₃H, SO₂NHC₂H₄SO₂C₂H₄OSO₃H | " | ![benzene] SO₃H, H₂N, SO₃H | " | " |

-continued
| 1 | 2 | 3 | 4 | 5 | 6 |
|---|---|---|---|---|---|
| 20 | " | " | 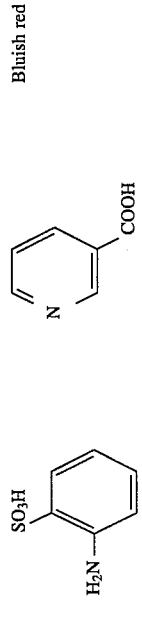 | " | " |
| 21 | 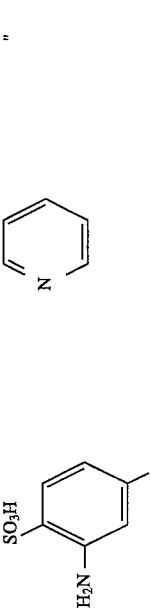 | 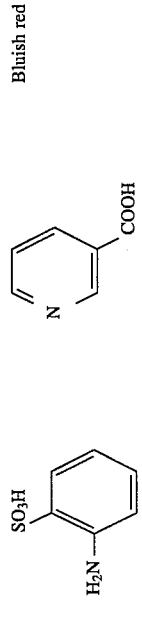 | 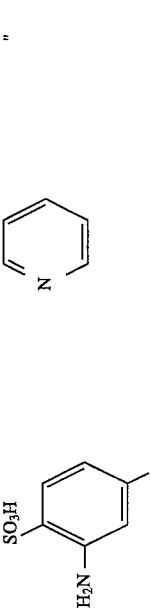 |  | Bluish red |
| 22 | " | " | 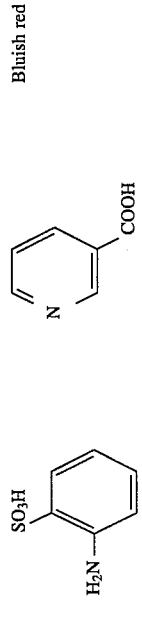 |  | " |

EXAMPLE 5

3-Aminobenzene-β-sulfatoethylsulfonyl (281 parts) was dissolved into an aqueous medium at a controlled pH of 5-7. Then, 1-sulfo-2-aminonaphthalene-5-sulfonyl chloride (321 parts) was slowly added thereto while controlling the temperature in the range of 0° C. to 30° C. and the pH value in the range of 5 to 7, and the reaction was completed under the same conditions as above. The product was isolated and purified to obtain 1-sulfo-2-aminonaphthalene-5-[N-(3'-β'-sulfatoethyl-sulfonyl)-phenyl]-sulfonamide.

On the other hand, cyanuric chloride (184.5 parts) was reacted in the usual manner successively with 1-amino-8-naphthol-3,6-disulfonic acid (319.3 parts) and aniline (93 parts) to obtain a di-condensation product represented by the following formula in the free acid form:

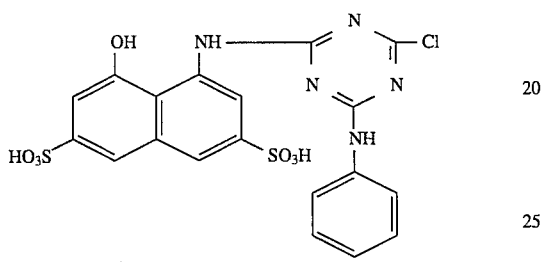

Then, 1-sulfo-2-aminonaphthalene-5-[N-(3'-β'-sulfatoethylsulfonyl)-phenyl]-sulfonamide (566.6 parts) synthesized above was diazotized in the usual manner and coupled with the di-condensation product represented by the above formula, and then condensed with 1-aminobenzene-3-β-sulfatoethyl sulfone (281.3 parts). The compound thus obtained was salted out with sodium chloride and isolated to obtain a monoazo compound represented by the following formula in the free acid form:

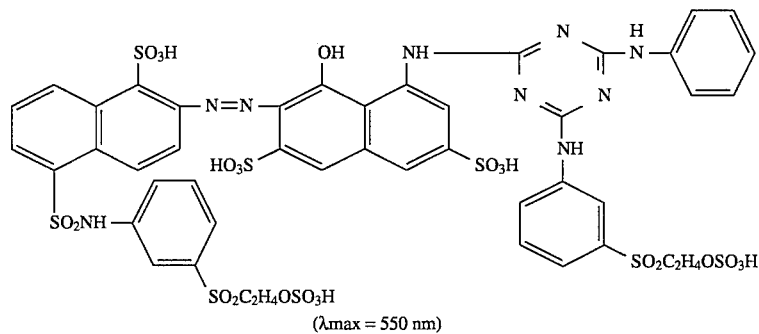

(λmax = 550 nm)

EXAMPLE 6

Example 5 can be repeated, except that the 1-sulfo-2-aminonaphthalene-5-[N-(3'-β40 -sulfatoethylsulfonyl)-phenyl]-sulfonamide, 1-amino-8-naphthol-3,6disulfonic acid, aniline and 3-aminobenzene-β-sulfatoethyl sulfone used in Example 5 are replaced with the compounds of Column 2, Column 3, Column 4 and Column 5, respectively, of the following table to obtain the corresponding monoazo compounds. When used for dyeing, they give dyed products of which hues are as shown in Column 6 of the table.

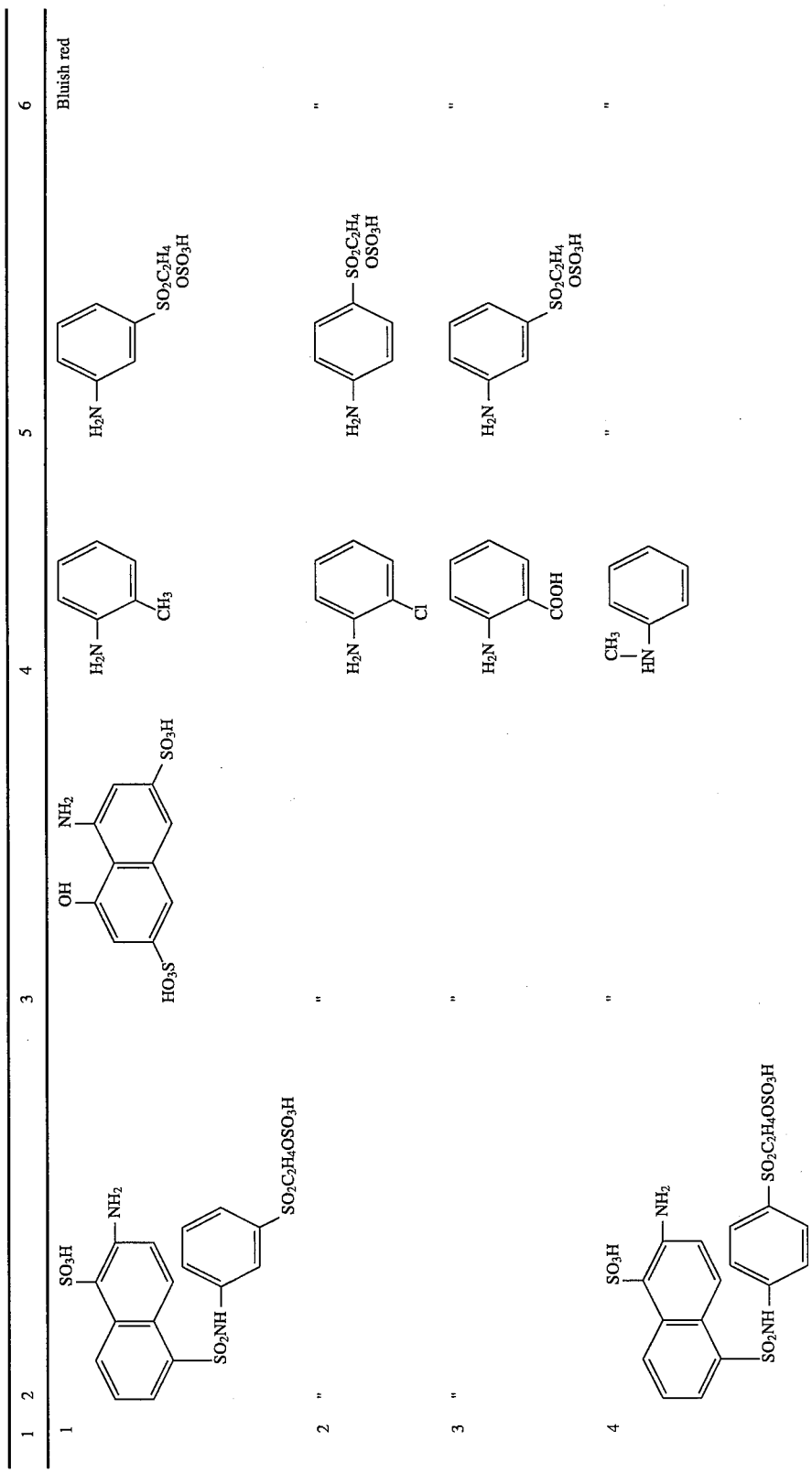

-continued

| 1 | 2 | 3 | 4 | 5 | 6 |
|---|---|---|---|---|---|
| 5 | naphthalene with NH₂, SO₃H, SO₂NH–C₆H₄–SO₂C₂H₄OSO₃H substituents | 4-amino-5-hydroxynaphthalene-2,7-disulfonic acid (NH₂, OH, SO₃H, HO₃S) | N-methylaniline (CH₃–HN–C₆H₅) | 3-aminobenzene with SO₂C₂H₄OSO₃H (H₂N–C₆H₄–SO₂C₂H₄OSO₃H) | Bluish red |
| 6 | " | " | 4-chloroaniline (H₂N–C₆H₄–Cl) | H₂NC₃H₆SO₂C₂H₄OSO₃H | " |
| 7 | " | " | 3-aminobenzenesulfonic acid (H₂N–C₆H₄–SO₃H) | 2-amino-6-sulfonaphthalene with SO₂C₂H₄OSO₃H (H₂N-naphthyl-SO₂C₂H₄OSO₃H, SO₃H) | " |
| 8 | aminobenzene with SO₃H, OCH₃, SO₂NH–C₆H₄–SO₂C₂H₄OSO₃H | " | 4-bromoaniline (H₂N–C₆H₄–Br) | 3-aminobenzene with SO₂C₂H₄OSO₃H (H₂N–C₆H₄–SO₂C₂H₄OSO₃H) | Red |
| 9 | aminobenzene with SO₃H, SO₂NH–C₆H₄–SO₂C₂H₄OSO₃H | 4-amino-5-hydroxynaphthalene-2,7-disulfonic acid (NH₂, OH, SO₃H, HO₃S) | 4-methylaniline (H₂N–C₆H₄–CH₃) | 2-methoxy-5-aminobenzene with SO₂C₂H₄OSO₃H (OCH₃, H₂N, SO₂C₂H₄OSO₃H) | Red |

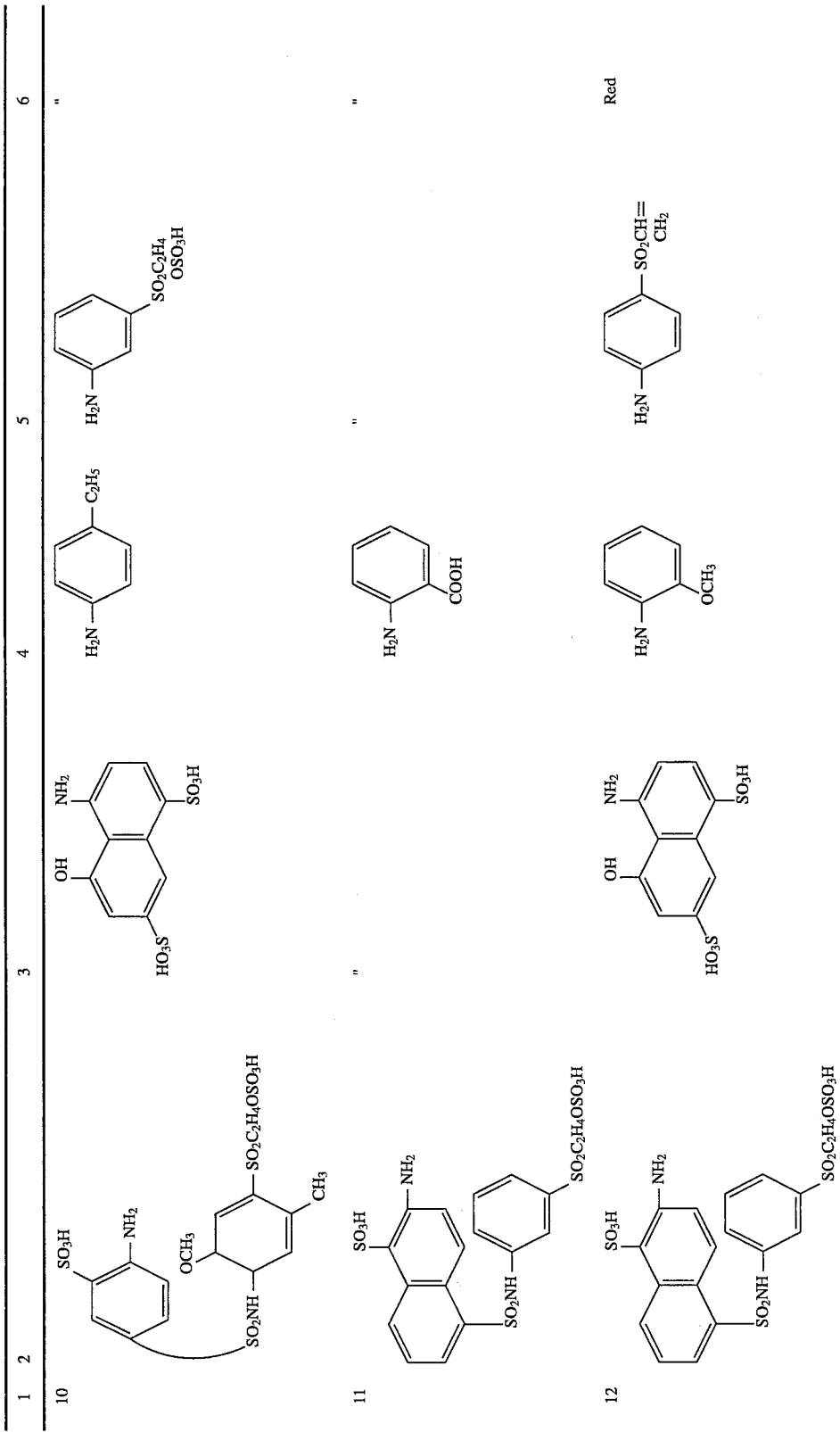

| 1 | 2 | 3 | 4 | 5 | 6 |
|---|---|---|---|---|---|
| 13 | 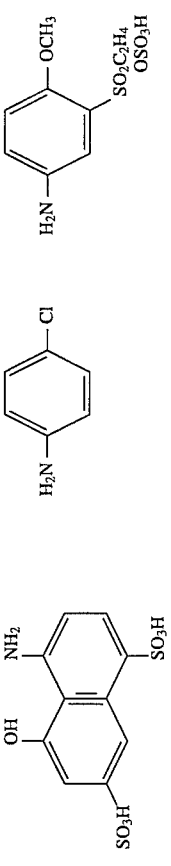 |  |  | 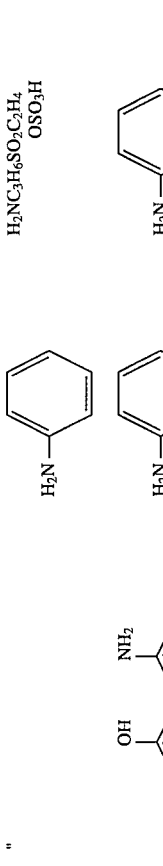 | " |
| 14 | 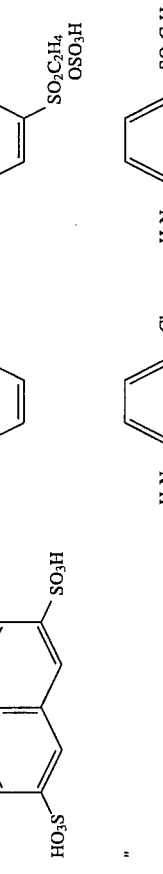 | 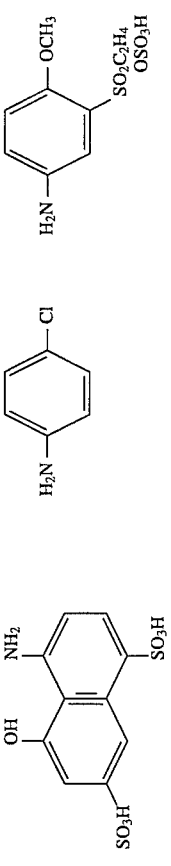 | $H_2N$-$nC_3H_7$ |  | Bluish red |
| 15 | " | " |  | $H_2NC_3H_6SO_2C_2H_4OSO_3H$ | " |
| 16 | 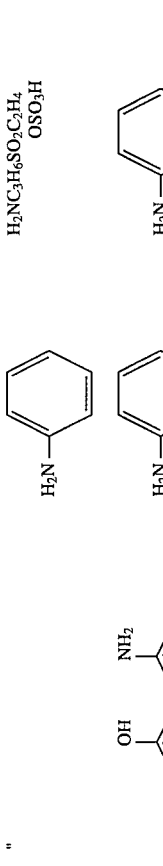 | 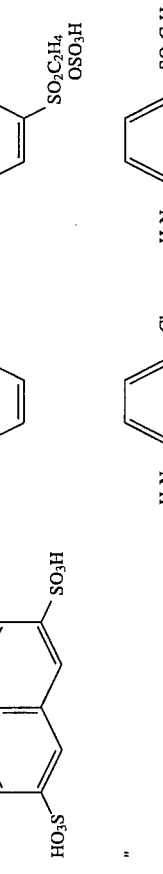 |  |  | Bluish red |
| 17 | " | " | 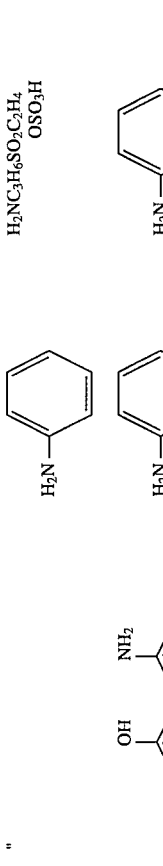 | 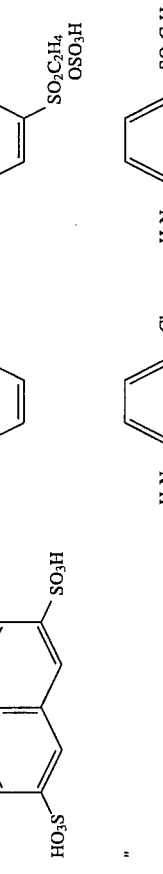 | " |

-continued

| 1 | 2 | 3 | 4 | 5 | 6 |
|---|---|---|---|---|---|
| 18 | naphthalene with SO₃H, NH₂, SO₂NHC₃H₆SO₂C₂H₄OSO₃H substituents | " | H₂N–C₆H₄–CH₃ (p-toluidine) | H₂N–C₆H₄–SO₂C₂H₄OSO₃H (meta) | " |
| 19 | naphthalene with SO₃H, NH₂, SO₂NH–C₆H₄–SO₂C₂H₄OSO₃H (meta) substituents | naphthalene with OH, NH₂, SO₃H substituents | H₂N–C₆H₅ (aniline) | H₂N–C₆H₄–SO₂C₂H₄OSO₃H (para) | Orange |
| 20 | naphthalene with SO₃H, NH₂, SO₂NH–C₆H₄–SO₂C₂H₄OSO₃H (meta) substituents | naphthalene with OH, NH–CH₃, SO₃H substituents | H₂N–C₆H₄–CH₃ (p-toluidine) | H₂N–C₆H₄–SO₂C₂H₄OSO₃H (para) | Orange |
| 21 | " | naphthalene with NH₂, OH, SO₃H, SO₃H substituents | morpholine (HN with O) | H₂N–C₆H₄–SO₂C₂H₄OSO₃H (meta) | Bluish red |
| 22 | " | " | piperidine (HN) | C₂H₅–HN–C₆H₄–SO₂C₂H₄OSO₃H (meta) | " |

-continued

| 1 | 2 | 3 | 4 | 5 | 6 |
|---|---|---|---|---|---|
| 23 | naphthalene with NH₂, SO₃H, SO₂NH-phenyl-SO₂C₂H₄OSO₃H substituents | 8-amino-1-hydroxynaphthalene-3,6-disulfonic acid (H-acid) | thiomorpholine-1,1-dioxide (HN-ring-SO₂) | 3-(ethylamino)phenyl-SO₂C₂H₄OSO₃H | Bluish red |
| 24 | naphthalene with NH₂, SO₃H, SO₂NHC₂H₄SO₂C₂H₄OSO₃H substituents | " | morpholine (HN-ring-O) | 3-aminophenyl-SO₂C₂H₄OSO₃H | " |
| 25 | " | " | cyclohexylamine (H₂N-cyclohexyl) | " | " |
| 26 | naphthalene with NH₂, SO₃H, SO₂NH-phenyl-SO₂C₂H₄OSO₃H substituents | " | H₂NC₂H₄SO₃H | " | " |

| 1 | 2 | 3 | 4 | 5 | 6 |
|---|---|---|---|---|---|
| 27 | naphthalene with SO₃H, NH₂, SO₂NH-phenyl-SO₂C₂H₄OSO₃H | naphthalene with OH, NH₂, two SO₃H | CH₃, HN—C₂H₄SO₃H | H₂N-phenyl-SO₂C₂H₄OSO₃H | Bluish red |
| 28 | naphthalene with SO₃H, NH₂, SO₂NHC₂H₄SO₂C₂H₄OSO₃H | " | H₂N-phenyl-SO₃H | " | " |
| 29 | " | " | H₂N-phenyl(COOH) | " | " |
| 30 | naphthalene with SO₃H, NH₂, SO₂NHC₂H₄SO₂C₂H₄OSO₃H | naphthalene with OH, NH₂, two SO₃H | H₂N-phenyl-SO₃H | C₂H₅-HN-phenyl-SO₂C₂H₄OSO₃H | Bluish red |

EXAMPLE 7

Cyanuric chloride (184.5 parts) and methanol (32 parts) were subjected to a condensation reaction in the usual manner, and then reacted with 1-amino-8-naphthol-3,6-disulfonic acid (319.3 parts) in a weakly acidic aqueous medium to obtain a di-condensation product represented by the following formula in the free acid form:

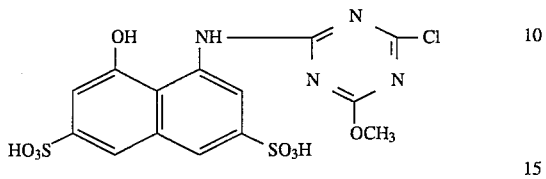

On the other hand, 1-sulfo-2-aminonaphthalene-5-[N-(3'-β'-sulfatoethylsulfonyl)-phenyl]-sulfonamide (566.6 parts) was diazotized in the usual manner and coupled with the di-condensation product represented by the above formula, and then condensed with 3-aminobenzene-β-sulfatoethyl sulfone (281.3 parts). The compound thus formed was salted out with sodium chloride and isolated to obtain a monoazo compound represented by the following formula in the free acid forms:

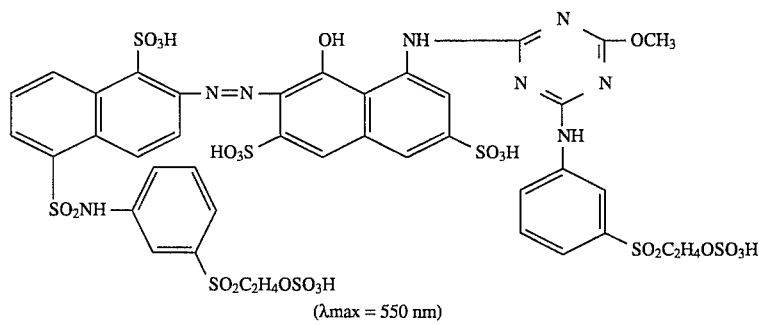

(λmax = 550 nm)

EXAMPLE 8

Example 7 can be repeated, except that the 1-sulfo-2-aminonaphthalene-5-[N-(3'-β'-sulfatoethylsulfonyl)-phenyl]-sulfonamide, 1-amino-8-naphthol-3,6-disulfonic acid, methanol and 3-aminobenzene-β-sulfatoethyl sulfone used in Example 7 are replaced with the compounds of Column 2, Column 3, Column 4 and Column 5, respectively, of the following table, to obtain the corresponding monoazo compounds. When used for dyeing, they gave dyed products of which hues are as shown in Column 6 of the table.

| 1 | 2 | 3 | 4 | 5 | 6 |
|---|---|---|---|---|---|
| 1 | (diazo component: 2-amino-1-naphthalene sulfonic acid with SO₂NH-phenyl-SO₂C₂H₄OSO₃H) | 1-amino-8-hydroxynaphthalene-3,6-disulfonic acid | HOC₂H₅ | 3-amino-phenyl-SO₂C₂H₄OSO₃H | Bluish red |
| 2 | " | " | HOCH(CH₃)₂ | " | Bluish red |
| 3 | " | " | phenol | " | Bluish red |
| 4 | " | " | o-cresol | " | Bluish red |
| 5 | " | " | o-chlorophenol | 3-amino-phenyl-SO₂C₂H₄OSO₃H | Bluish red |
| 6 | " | " | p-cresol | 4-amino-phenyl-SO₂C₂H₄OSO₃H | Bluish red |

| 1 | 2 | 3 | 4 | 5 | 6 |
|---|---|---|---|---|---|
| 7 | 2-amino-1-SO₃H naphthalene, 5-SO₂NH-(4-SO₂C₂H₄OSO₃H-phenyl) | " | 2-methoxyphenol (OH, OCH₃) | | Bluish red |
| 8 | " | 8-amino-1-hydroxy-3,6-disulfonic naphthalene (NH₂, OH, 2×SO₃H) | phenol | 4-(SO₂CH=CH₂)aniline | Bluish red |
| 9 | 2-amino-1-SO₃H naphthalene, 5-SO₂NH-C₂H₄SO₂C₂H₄OSO₃H | " | 2-chlorophenol | 4-(SO₂CH=CH₂)aniline | Bluish red |
| 10 | 2-amino-1-SO₃H naphthalene, 5-SO₂NH-(4-SO₂CH=CH₂-phenyl) | " | 2-methoxyphenol | 2-amino-5-methoxy-4-(SO₂C₂H₄OSO₃H)benzene | Bluish red |
| 11 | 2-amino-1-SO₃H naphthalene, 5-SO₂NH-(3-SO₂C₂H₄OSO₃H-phenyl) | 4-amino-5-hydroxy-1,7-disulfonic naphthalene | phenol | 4-(SO₂C₂H₄OSO₃H)aniline | Red |

-continued

| 1 | 2 | 3 | 4 | 5 | 6 |
|---|---|---|---|---|---|
| 12 | ![2-amino-1-sulfo-5-(3-(β-sulfatoethylsulfonyl)phenylsulfonylamino)naphthalene] | ![1-amino-8-hydroxy-4,6-disulfonaphthalene] | 4-chlorophenol | 3-amino-3-ethyl-phenyl-SO₂C₂H₄OSO₃H | Red |
| 13 | " | ![1-amino-8-hydroxy-3,6-disulfonaphthalene] | 4-methylphenol | H₂NC₃H₆SO₂C₂H₄OSO₃H | Bluish red |
| 14 | " | " | thiophenol (HS-Ph) | 3-amino-phenyl-SO₂C₂H₄OSO₃H | Bluish red |
| 15 | ![2-amino-1-sulfo-4-(3-(β-sulfatoethylsulfonyl)phenylsulfonylamino)benzene] | " | 4-chlorophenol | " | Red |

-continued

| 1 | 2 | 3 | 4 | 5 | 6 |
|---|---|---|---|---|---|
| 16 | 2-amino-5-(β-sulfatoethylsulfonyl)anilide of 2-amino-1,4-benzenedisulfonic acid (SO₃H, NH₂, NHO₂S-C₆H₄-SO₂C₂H₄OSO₃H) | 1-amino-8-hydroxy-3,6-naphthalenedisulfonic acid (NH₂, OH, SO₃H, HO₃S) | 4-chlorophenol (HO–C₆H₄–Cl) | 3-amino-phenyl-β-sulfatoethylsulfone (H₂N–C₆H₄–SO₂C₂H₄OSO₃H) | Red |
| 17 | 2-amino-1,5-naphthalenedisulfonic acid 8-(3-β-sulfatoethylsulfonylphenyl)sulfonamide (SO₃H, NH₂, SO₂NH–C₆H₄–SO₂C₂H₄OSO₃H) | " | 2-aminobenzenesulfonic acid (SO₃H, H₂N) | " | Bluish red |
| 18 | " | " | 2-amino-1,4-benzenedisulfonic acid (SO₃H, H₂N, SO₃H) | 4-chloro-3-aminophenyl vinylsulfone (Cl, H₂N, SO₂CH=CH₂) | Bluish red |
| 19 | 2-amino-1,5-naphthalenedisulfonic acid 6-sulfamoyl-β-sulfatoethyl (SO₃H, NH₂, SO₂NHC₂H₄SO₂C₂H₄OSO₃H) | 1-amino-8-hydroxy-3,6-naphthalenedisulfonic acid (NH₂, OH, SO₃H, HO₃S) | p-cresol (HO–C₆H₄–CH₃) | 3-amino-phenyl-β-sulfatoethylsulfone (H₂N–C₆H₄–SO₂C₂H₄OSO₃H) | Bluish red |

-continued

| 1 | 2 | 3 | 4 | 5 | 6 |
|---|---|---|---|---|---|
| 20 | (naphthalene with NH₂, SO₃H, SO₂NH linked to phenyl-SO₂C₂H₄OSO₃H) | (naphthalene with OH, NH, SO₃H) | phenol (HO-) | " | Orange |
| 21 | (naphthalene with NH₂, SO₃H, SO₂NH linked to phenyl-SO₂C₂H₄OSO₃H) | (naphthalene with NH₂, OH, SO₃H, SO₃H) | benzene with SO₃H, NH₂, SO₃H | " | Bluish red |
| 22 | (naphthalene with NH₂, SO₃H, SO₂NH linked to phenyl-SO₂C₂H₄OSO₃H) | (naphthalene with NH₂, OH, SO₃H, SO₃H) | benzene with SO₃H, NH₂, SO₃H | benzene with HN-C₂H₄OH, SO₂C₂H₄OSO₃H | Bluish red |
| 23 | " | " | benzene with HN-C₂H₅, SO₂C₂H₄OSO₃H | benzene with H₂N, SO₃H | Bluish red |

| 1 | 2 | 3 | 4 | 5 | 6 |
|---|---|---|---|---|---|
| 24 | 1-SO$_3$H, 2-NH$_2$, 5-SO$_2$NHC$_2$H$_4$OSO$_3$H naphthalene | " | 2-aminobenzenesulfonic acid | 3-amino-phenyl-SO$_2$C$_2$H$_4$OSO$_3$H | Bluish red |
| 25 | 1-SO$_3$H, 2-NH$_2$, 5-SO$_2$NHC$_2$H$_4$OSO$_3$H naphthalene | 1-NH$_2$, 5-OH, 3,7-di-SO$_3$H naphthalene | 1,4-di-SO$_3$H, 2-NH$_2$ benzene | 3-amino-phenyl-SO$_2$C$_2$H$_4$OSO$_3$H | Bluish red |

Dyeing Example 1

Each of the monoazo compounds (0.3 part) obtained in Examples 1 to 8 was dissolved into water (200 parts). Sodium sulfate (20 parts) and cotton (10 parts) were added, and the temperature was elevated to 50° C. After 30 minutes had passed, sodium carbonate (4 parts) was added and dyeing was carried out at that temperature for one hour. After completing the dyeing, the dyed cotton was washed with water and soaped to obtain a orange- or red-colored dyed product of high color depth excellent in fastness properties, particularly chlorine fastness, sunlight fastness and perspiration-sunlight fastness, and build-up property.

Dyeing Example 2

Each of the monoazo compounds (0.3 part) obtained in Examples 1 to 8 was dissolved into water (300 parts). Sodium sulfate (30 parts) and cotton (10 parts) were added, and the temperature was elevated to 60° C. After 20 minutes had passed, sodium carbonate (5 parts) was added, and dyeing was carried out at that temperature for one hour. After completing the dyeing, the dyed cotton was washed with water and soaped to obtain a orange- or red-colored dyed product of high color depth excellent in fastness properties, particularly sunlight fastness and perspiration-sunlight fastness, and build-up property.

Dyeing Example 3

| Composition of color paste: | |
|---|---|
| Each of the monoazo compounds obtained in Examples 1 to 8 | 5 parts |
| Urea | 5 parts |
| Sodium alginate (5%) stock paste | 50 parts |
| Hot water | 25 parts |
| Sodium bicarbonate | 2 parts |
| Balance | 13 parts |

A mercerized cotton broad cloth was printed with each color paste. After intermediate drying, it was steamed at 100° C. for 5 minutes, washed with hot water, soaped, again washed with hot water and dried.

Thus, there was obtained orange- or red-colored printed products high in fixation percentage and excellent in fastness properties, particularly sunlight fastness and perspiration-sunlight fastness, and build-up property.

Dyeing Example 4

Each of the monoazo compounds (25 parts) obtained in Examples 1 to 8 was dissolved into hot water and cooled to 25° C. Then, 32.5% aqueous solution of sodium hydroxide (5.5 parts) and 50° Bé water glass (150 parts) were added thereto together with a quantity of water enough to give a total quantity of 1,000 parts at 25° C. Immediately after it, the resulting solution was used as a padding solution to pad a cotton woven fabric. After winding up the padded cotton woven fabric, it was tightly sealed with a polyethylene film and stored in a room kept at 20° C.

On the other hand, another cotton woven fabric was padded, wound up and sealed with a polyethylene film in the same manner as above, and stored in a room kept at 5° C. Both the padded fabrics were allowed to stand for 20 hours, and the dyed products thus obtained were washed first with cold water and then with hot water, soaped in a boiling detergent, again washed with cold water and dried.

Differences in the hue and the color depth between the dyed product stored at 20° C. for 20 hours and the dyed product stored at 5° C. for 20 hours were measured. As the result, scarce differences were obtained between them. By a cold batch up dyeing, dyed products excellent in build-up property were obtained therefrom.

Dyeing Example 5

Each of the monoazo compounds (25 parts) obtained in Examples 1 to 8 was dissolved into hot water and cooled to 25° C. Then, 32.5% aqueous solution of sodium hydroxide (10 parts) and anhydrous sodium sulfate (30 parts) were added thereto together with a quantity of water enough to give a total quantity of 1,000 parts at 25° C. Immediately after it, the resulting solution was used as a padding solution to pad a viscose rayon woven fabric. The padded viscose rayon fabric was wound up, tightly sealed with a polyethylene film, and stored in a room kept at 20° C.

On the other hand, another viscose rayon woven fabric was padded, wound up and sealed with a polyethylene film in the same manner as above. It was stored in a room kept at 5° C.

After allowing both the padded fabrics to stand for 20 hours, the dyed products thus obtained were washed first with cold water and then with hot water, soaped in a boiling detergent, again washed with cold water and dried.

Differences in the hue and the color depth between the dyed product stored at 20° C. for 20 hours and the dyed product stored at 5° C. for 20 hours were measured. As the result, starce differences were observed between them.

Dyeing Example 6

Dyeing Example 2 was repeated, except that the amount of sodium carbonate was altered from 5 parts in Deying Example 2 to 3 parts. All the monoazo compounds used gave dyed products of which qualities were equal to that of the dyed product obtained in Dyeing Example 2.

Dyeing Example 7

Dyeing Example 2 was repeated, except that the temperature was altered from 60° C. to 50° C. All the monoazo compounds used gave dyed products of which qualities were aqual to that of the dyed product obtained in Dyeing Example 2. When the dyeing temperature was 70° C., too, the results were similar to the above.

Dyeing Example 8

Dyeing Example 2 was repeated, except that the amount of sodium sulfate was altered from 30 parts to 15 parts. All the monoazo compounds used gave dyed products of which qualities were equal to that of the dyed product obtained in Dyeing Example 2.

We claim:

1. A compound represented by the following formula (VIII),

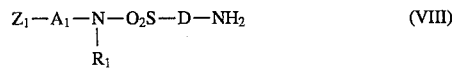

wherein D is

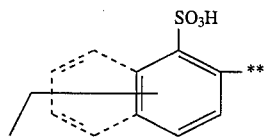

in which the mark ** means a bond linking to —NH$_2$, R$_1$ is hydrogen, an unsubstituted alkyl group or an alkyl group substituted by at least one substituent selected from the group consisting of hydroxy, cyano, alkoxy, halo, carbamoyl, carboxy, alkoxycarbonyl, alkylcarbonyloxy, sulfo and sulfamoyl; A$_1$ is phenylene unsubstituted or substituted once or twice by a substituent selected from the group consisting of methyl, ethyl, methoxy, ethoxy, chloro, bromo and sulfo and naphthylene unsubstituted or substituted by sulfo; and Z$_1$ is —SO$_2$CH=CH$_2$ or —SO$_2$CH$_2$CH$_2$Y in which Y is a group capable of being split by the action of an alkali.

2. The compound according to claim 1, wherein R$_1$ is hydrogen.

3. The compound according to claim 1, wherein Z is —SO$_2$CH=CH$_2$ or —SO$_2$CH$_2$CH$_2$OSO$_3$H.

* * * * *